US011683733B2

(12) United States Patent
Jang et al.

(10) Patent No.: US 11,683,733 B2
(45) Date of Patent: Jun. 20, 2023

(54) METHOD AND DEVICE FOR HANDLING LBT FAILURE INDICATOR WHEN DAPS HANDOVER IS CONFIGURED IN WIRELESS COMMUNICATION SYSTEM

(71) Applicant: Samsung Electronics Co., Ltd., Suwon-si (KR)

(72) Inventors: Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/236,309

(22) Filed: Apr. 21, 2021

(65) Prior Publication Data
US 2021/0345200 A1 Nov. 4, 2021

(30) Foreign Application Priority Data

Apr. 22, 2020 (KR) .................. 10-2020-0048450
May 8, 2020 (KR) .................. 10-2020-0055488

(51) Int. Cl.
*H04W 36/00* (2009.01)
*H04W 56/00* (2009.01)
(Continued)

(52) U.S. Cl.
CPC ....... *H04W 36/0079* (2018.08); *H04W 36/08* (2013.01); *H04W 56/001* (2013.01); *H04W 74/04* (2013.01)

(58) Field of Classification Search
CPC ... H04W 56/0001–0095; H04W 74/04; H04W 36/0079; H04W 36/08
See application file for complete search history.

(56) References Cited

U.S. PATENT DOCUMENTS

2018/0184475 A1* 6/2018 Babaei .................. H04W 16/14
2019/0069325 A1* 2/2019 Yerramalli ............ H04W 52/38
(Continued)

FOREIGN PATENT DOCUMENTS

KR 10-2020-0114224 A 10/2020
WO 2017/136458 A2 8/2017
(Continued)

OTHER PUBLICATIONS

Ericsson, "[108#28][R16 RRC] 38331 Rel-16 CR Merge," R2-2001086, 3GPP TSG RAN WG2 Meeting #109e, Feb. 14, 2020.
(Continued)

*Primary Examiner* — Mohammad S Adhami
*Assistant Examiner* — Vladislav Y Agureyev
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a terminal in a communication system is provided. The method includes receiving, from a first base station, a first message including first information used for detection of consistent uplink listen before talk (LBT) failures for the first base station, receiving, from the first base station, a second message for a handover to a second base station, the second message including second information for a reconfiguration with sync, in case that third information configuring at least one dual active protocol stack (DAPS) bearer is included in the
(Continued)

second message and an indication of the consistent uplink LBT failures for the first base station is identified based on the first information while performing a procedure associated with the handover, suspending data communication of all data radio bearers (DRBs) associated with the first base station.

18 Claims, 12 Drawing Sheets

(51) Int. Cl.
*H04W 74/04* (2009.01)
*H04W 36/08* (2009.01)

(56) References Cited

U.S. PATENT DOCUMENTS

| | | | |
|---|---|---|---|
| 2020/0275485 A1* | 8/2020 | Babaei | H04W 74/0808 |
| 2020/0314903 A1 | 10/2020 | Jang et al. | |
| 2021/0037591 A1* | 2/2021 | Niu | H04W 76/19 |
| 2021/0051556 A1* | 2/2021 | Lin | H04W 76/11 |
| 2021/0144755 A1* | 5/2021 | Ozturk | H04W 74/0816 |
| 2021/0176681 A1* | 6/2021 | Ozturk | H04W 36/34 |
| 2021/0219322 A1* | 7/2021 | Chin | H04L 1/1893 |
| 2022/0038985 A1* | 2/2022 | Deenoo | H04W 36/305 |
| 2022/0086784 A1* | 3/2022 | Kim | H04W 56/0035 |
| 2022/0167408 A1* | 5/2022 | Lee | H04W 74/0808 |

FOREIGN PATENT DOCUMENTS

| | | | |
|---|---|---|---|
| WO | WO-2018192356 A1 * | 10/2018 | H04W 28/26 |
| WO | WO-2020033364 A1 * | 2/2020 | H04W 36/08 |
| WO | WO-2020221850 A1 * | 11/2020 | H04W 36/06 |
| WO | WO-2021204835 A1 * | 10/2021 | |

OTHER PUBLICATIONS

Spreadtrum Communications, "Mobility Consideration in NR-U," R2-1909082, 3GPP TSG RAN WG2 Meeting #107, Prague, Czech Republic, Aug. 15, 2019.

Ericsson, "Open issues for user plane aspects of DAPS handover," R2-2002590, 3GPP TSG RAN WG2 #109bis-e, Elbonia, Apr. 9, 2020.

Qualcomm Incorporated, "Discussion regarding NR-U RRC Mobility Control," R4-2002133, 3GPP TSG RAN WG4 RAN4#94, E-meeting, Feb. 14, 2020.

International Search Report dated Jul. 21, 2021, issued in International Application No. PCT/KR2021/004989.

* cited by examiner

Source protocol

Step 1 : Before HO ~ 8-05

Step 2 : Before RACH ~ 8-10

Step 3 : During RACH ~ 8-15

Step 4 : During the transmission of HO complete ~8-20

Step 5 : After RAR ~8-25

Step 6 : After release of source ~8-30

METHOD AND DEVICE FOR HANDLING LBT FAILURE INDICATOR WHEN DAPS HANDOVER IS CONFIGURED IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0048450, filed on Apr. 22, 2020, in the Korean Intellectual Property Office, and of a Korean patent application number 10-2020-0055488, filed on May 8, 2020, in the Korean Intellectual Property Office, the disclosure of each of which is incorporated by reference herein in its entirety.

BACKGROUND

1. Field

The disclosure relates to a method in which, when a third generation partnership project (3GPP) 5th generation (5G) new radio (NR) technology is used in an unlicensed band in a wireless communication system, dual active protocol stack (DAPS) handover (HO) is configured, so that an uplink listen-before-talk (LBT) failure is detected and recovered while a source base station and a target base station are concurrently communicating and performing handover.

2. Description of Related Art

To meet the demand for wireless data traffic having increased since deployment of 4th generation (4G) communication systems, efforts have been made to develop an improved 5G or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for handling an uplink transmission failure problem due to interference of other devices in an unlicensed band during DAPS handover.

In accordance with an aspect of the disclosure, a method performed by a terminal in a communication system is provided. The method includes receiving, from a first base station, a first message including first information used for detection of consistent uplink listen before talk (LBT) failures for the first base station, receiving, from the first base station, a second message for a handover to a second base station, the second message including second information for a reconfiguration with sync, in case that third information configuring at least one dual active protocol stack (DAPS) bearer is included in the second message and an indication of the consistent uplink LBT failures for the first base station is identified based on the first information while performing a procedure associated with the handover, suspending data communication of all data radio bearers (DRBs) associated with the first base station.

In accordance with another aspect of the disclosure, a method performed by a first base station in a communication system is provided. The method includes transmitting, to a terminal, a first message including first information used for detection of consistent uplink LBT failures for the first base station, and transmitting, to the terminal, a second message for a handover to a second base station, the second message including second information for a reconfiguration with sync, wherein, in case that the second message includes third information configuring at least one DAPS bearer and an indication of the consistent uplink LBT failures for the first base station is identified based on the first information while a procedure associated with the handover is performed, data communication of all DRBs associated with the first base station is suspended.

In accordance with another aspect of the disclosure, a terminal in a communication system is provided. The terminal includes a transceiver, and a controller coupled with the transceiver and configured to receive, from a first base station, a first message including first information used for detection of consistent uplink LBT failures for the first base station, receive, from the first base station, a second message for a handover to a second base station, the second message including second information for a reconfiguration with sync, in case that third information configuring at least one DAPS bearer is included in the second message and an indication of the consistent uplink LBT failures for the first base station is identified based on the first information while performing a procedure associated with the handover, suspend data communication of all DRBs associated with the first base station.

In accordance with another aspect of the disclosure, a first base station in a communication system is provided. The first base station includes a transceiver, and a controller coupled with the transceiver and configured to transmit, to a terminal, a first message including first information used for detection of consistent uplink LBT failures for the first base station, and transmit, to the terminal, a second message for a handover to a second base station, the second message including second information for a reconfiguration with sync, wherein, in case that the second message includes third information configuring at least one DAPS bearer and an indication of the consistent uplink LBT failures for the first base station is identified based on the first information while a procedure associated with the handover is performed, data communication of all DRBs associated with the first base station is suspended.

According to the disclosure, it is possible to reduce a delay due to occurrence of an LBT failure during DAPS handover in an unlicensed band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the long term evolution (LTE) and new radio (NR) standards, which are the latest standards specified by the 3rd generation partnership project (3GPP) among the existing communication standards, for the convenience of description. However, the disclosure is not limited by these terms and names, and may be applied in the same way to systems that conform other standards. In particular, the disclosure may be applied to the 3GPP NR (5th-generation mobile communication standard).

Figure 1:
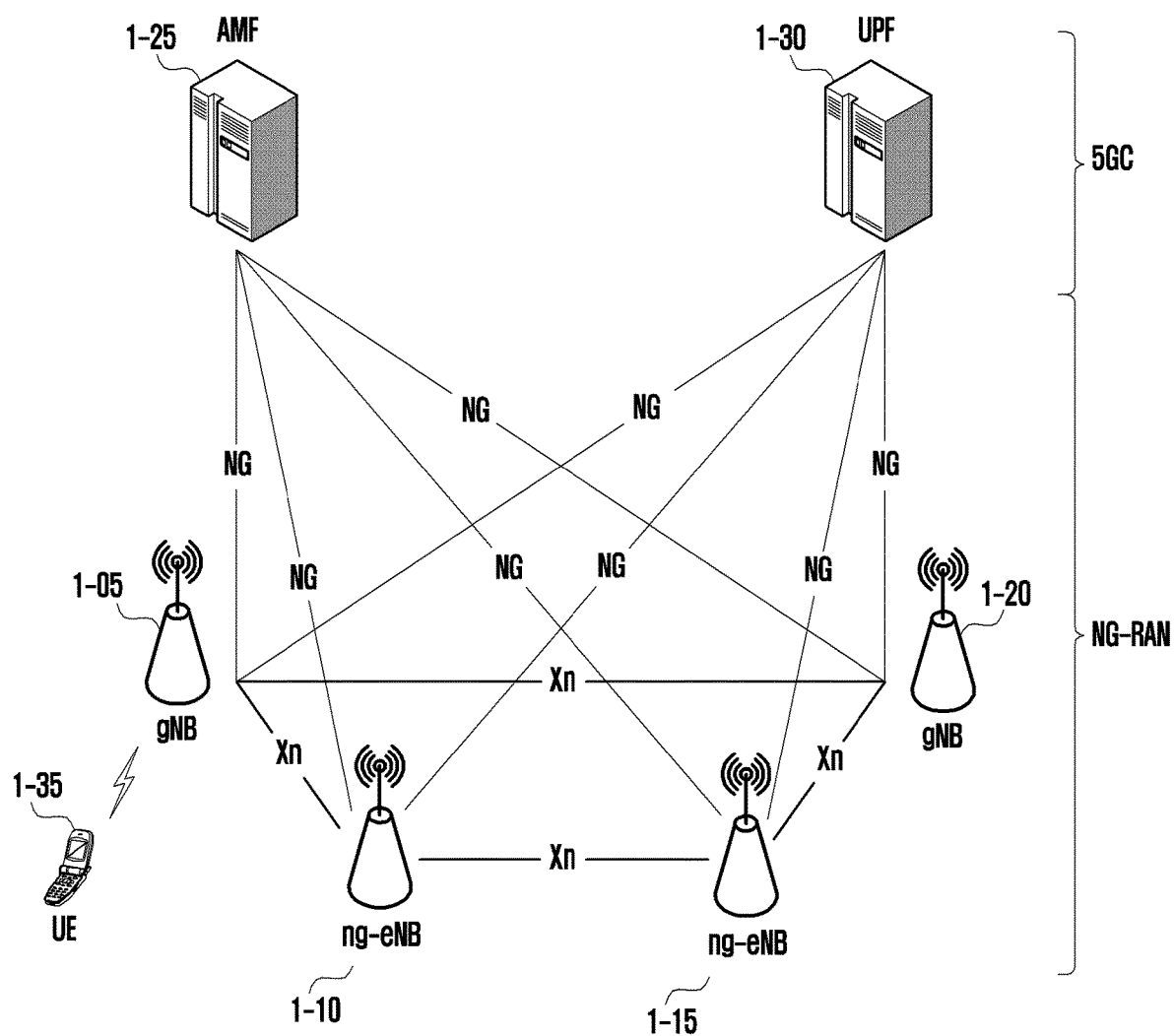
FIG. 1 is a diagram illustrating a structure of a new radio (NR) system according to an embodiment of the disclosure.

FIG. 1 is a diagram illustrating a structure of an NR system according to an embodiment of the disclosure.

Referring to FIG. 1, the wireless communication system includes a plurality of base stations 1-05, 1-10, 1-15, and 1-20, an access and mobility management function (AMF) 1-25, and a user plane function (UPF) 1-30. A user terminal (user equipment, hereinafter, referred to as UE or terminal) 1-35 accesses an external network via the base stations 1-05, 1-10, 1-15, and 1-20 and the UPF 1-30.

The base stations 1-05, 1-10, 1-15, and 1-20 are access nodes of a cellular network and provide wireless access to terminals accessing the network. That is, the base stations 1-05, 1-10, 1-15, and 1-20 collect state information, such as buffer states, available transmission power states, and channel states of terminals, and perform scheduling so as to serve traffic of users, and support connection between the terminals and a core network (CN; in particular, CN of NR is referred to as 5GC). In communication, a user plane (UP) related to actual user data transmission and a control plane (CP), such as connection management, may be divided and configured, wherein, in the drawing, the next generation NodeBs (gNBs) 1-05 and 1-20 use the UP and CP technologies defined in the NR technology, and although the ng-eNBs 1-10 and 1-15 are connected to the 5GC, the ng-eNBs 1-10 and 1-15 use the UP and CP technologies defined in the LTE technology.

The AMF/session management function (SMF) 1-25 is a device responsible for various control functions as well as a mobility management function for a terminal, and is connected to a plurality of base stations, and the UPF 1-30 is a kind of gateway device that provides data transmission.

Figure 2:
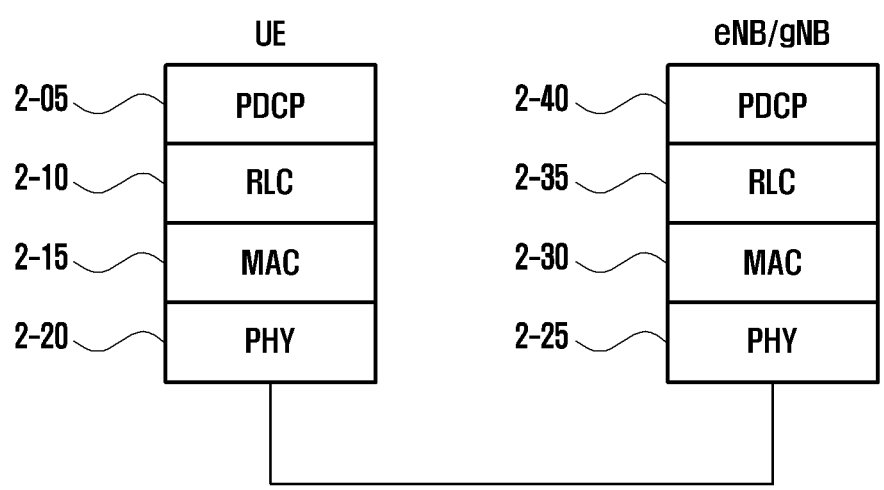
FIG. 2 is a diagram illustrating a radio protocol structure in long term evolution (LTE) system and NR system according to an embodiment of the disclosure.

FIG. 2 is a diagram illustrating a radio protocol structure in LTE system and NR system according to an embodiment of the disclosure.

Referring to FIG. 2, the radio protocol of the LTE system includes packet data convergence protocols (PDCPs) 2-05 and 2-40, radio link controls (RLCs) 2-10 and 2-35, and medium access controls (MACs) 2-15 and 2-30 in a UE and an evolved NodeB (eNB), respectively. The packet data convergence protocols (PDCPs) 2-05 and 2-40 are responsible for operations, such as IP header compression/restoration, and the radio link controls (hereinafter, referred to as RLCs) 2-10 and 2-35 reconfigure a PDCP packet data unit (PDU) to an appropriate size. The MACs 2-15 and 2-30 are connected to multiple RLC layer devices included in one terminal, multiplex RLC PDUs to MAC PDUs, and demultiplex the RLC PDUs from the MAC PDUs. The physical (PHY) layers 2-20 and 2-25 perform channel-coding and modulation of upper layer data, make the channel-coded and modulated upper layer data into orthogonal frequency division multiplexing (OFDM) symbols and transmit the OFDM symbols via a radio channel, or demodulate and channel-decode the OFDM symbols received through the radio channel and transfer the same to an upper layer. The physical layers use hybrid automatic repeat request (ARQ) (HARQ) for additional error correction, and a reception end transmits, in 1 bit, whether a packet transmitted by a transmission end is received. This is referred to as HARQ ACK/NACK information. In a case of LTE, downlink HARQ ACK/NACK information for uplink data transmission is transmitted via a physical hybrid-ARQ indicator channel (PHICH) which is a physical channel. In a case of NR, it may be determined, according to scheduling information of a corresponding terminal, whether retransmission is necessary or new transmission is performed in a physical dedicated control channel (PDCCH) that is a channel via which downlink/uplink resource allocation, etc. are transmitted. This is because asynchronous HARQ is applied in NR. Uplink HARQ ACK/NACK information for downlink data transmission may be transmitted via a physical channel, such as a physical uplink control channel (PUCCH) or a physical uplink shared channel (PUSCH). The PUCCH is generally transmitted in an uplink of a PCell which will be described later. However, if supported by a terminal, a base station may further transmit, to the terminal, the PUCCH in a secondary cell (SCell) which will be described later, and this is referred to as a PUCCH SCell.

Although not illustrated in the drawing, a radio resource control (RRC) layer is present above the PDCP layer of each of the terminal and the base station, and a configuration control message related to measurement and access may be exchanged for radio resource control, in the RRC layer.

Meanwhile, the PHY layer may include one or multiple frequencies/carriers, and a technology of concurrently configuring and using multiple frequencies is called a carrier aggregation technology (hereinafter, referred to as CA). In the CA technology, using of only one carrier for communication between a terminal (or user equipment (UE)) and a base station (evolved universal mobile telecommunications service (UMTS) terrestrial radio access network (E-UTRAN) evolved nodeB (eNB)) is changed into further using of one main carrier and one or multiple sub-carriers, so that the amount of transmission may be dramatically increased by the number of sub-carriers. In LTE, a cell in a base station, which uses a primary carrier, is referred to as a primary cell (PCell), and a cell in a base station, which uses a secondary carrier, is referred to as a secondary cell (SCell).

Figure 3:
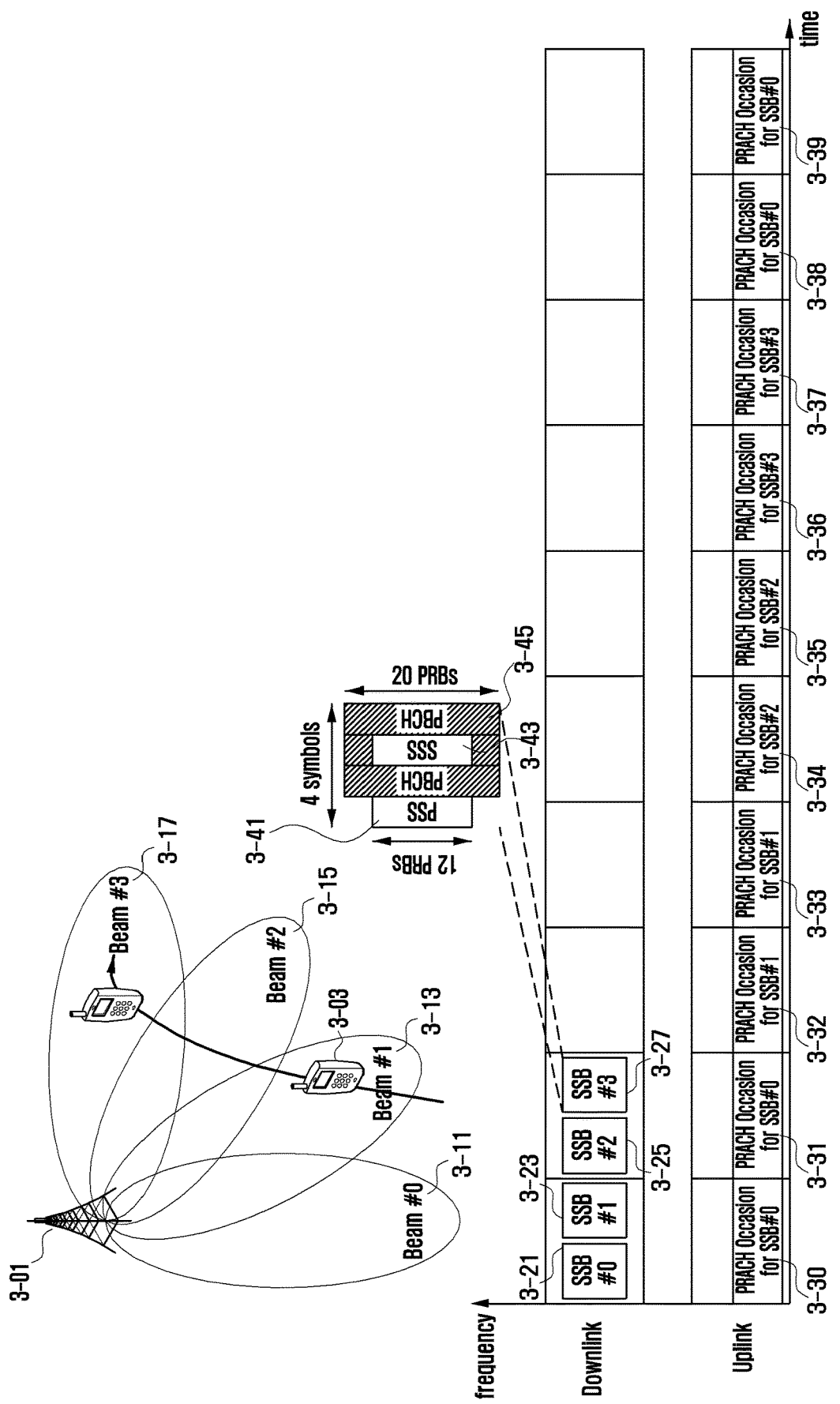
FIG. 3 is a diagram of a downlink and an uplink channel frame structure when communication is performed based on beams in an NR system according to an embodiment of the disclosure.

FIG. 3 is a diagram of a downlink and an uplink channel frame structure when communication is performed based on a beam in the NR system according to an embodiment of the disclosure.

Referring to FIG. 3, a base station 3-01 transmits signals in the form of a beam in order to transmit a strong signal or a signal with a wider coverage 3-11, 3-13, 3-15, and 3-17. Accordingly, a terminal 3-03 within the cell needs to transmit or receive data by using a specific beam (beam #1 3-13 in FIG. 3) transmitted by the base station.

Depending on whether the terminal is connected to the base station, states of the terminal are divided into an idle mode (RRC IDLE) and a connected mode (RRC_CONNECTED). The base station is unable to identify a location of the terminal in the idle mode.

If the terminal in the idle mode is to transition to the connected mode, the terminal receives synchronization signal blocks (SSBs) 3-21, 3-23, 3-25, and 3-27 transmitted by the base station. The SSB are SSB signals transmitted periodically according to a period configured by the base station, and the respective SSBs are divided into a primary synchronization signal (PSS) 3-41, a secondary synchronization signal (SSS) 3-43, and a physical broadcast channel (PBCH) (3-45).

In the diagram, it has been assumed that an SSB is transmitted for each beam. For example, it has been assumed that SSB #0 3-21 is transmitted using beam #0 3-11, SSB #1 3-23 is transmitted using beam #1 3-13, SSB #2 3-25 is transmitted using beam #2 3-15, and SSB #3 3-27 is transmitted using beam #3 3-17. In the diagram, it has been assumed that the terminal in the idle mode is located in beam #1. However, even when the terminal in the connected mode performs random access, the terminal selects an SSB received at a point in time when random access is performed.

Accordingly, in the drawing, SSB #1 transmitted via beam #1 is received. Upon reception of SSB #1, the terminal may acquire a physical cell identifier (PCI) of the base station via PSS and SSS, and the terminal may determine, by receiving PBCH, an identifier (i.e., #1) of a currently received SSB, and a position within a 10 ms frame, at which the current SSB is received, as well as a position within a system frame number (SFN) having a period of 10.24 seconds. A master information block (MIB) is included in the PBCH, and the MIB indicates a position at which system information block type (SIB) 1 (SIB1), which broadcasts more detailed cell configuration information, is to be received. Upon reception of SIB1, the terminal may identify a total number of SSBs transmitted by the base station, and may determine positions (in the diagram, a scenario of allocation at every 1 ms has been assumed: from 3-30 to 3-39) of physical random access channel (PRACH) occasions enabling random access for transition to the connected mode (more precisely, enabling transmission of a preamble that is a physical signal specifically designed for uplink synchronization). In addition, on the basis of the information, it is possible to identify which PRACH occasion among the PRACH occasions is mapped to which SSB index. For example, in the diagram, a scenario of allocation at every 1 ms has been assumed, and a scenario of allocating a ½ SSB per PRACH occasion (that is, two PRACH occasions per SSB) has been assumed. Accordingly, a scenario, in which two PRACH occasions are allocated to each SSB from a start of the PRACH occasions starting according to SFN values, is illustrated. That is, in the scenario, 3-30 and 3-31 are allocated for SSB #0, and 3-32 and 3-33 are allocated for SSB #1. Similarly, 3-34 and 3-35 are allocated for SSB #2, and 3-36 and 3-37 are allocated for SSB #3. After configuration for all SSBs, PRACH occasions 3-38 and 3-39 are reallocated for a first SSB.

Accordingly, the terminal identifies positions of the PRACH occasions 3-32 and 3-33 for SSB #1, and therefore transmits a random access preamble via a fastest PRACH occasion (for example, 3-32) at a current time point from among the PRACH occasions 3-32 and 3-33 corresponding to SSB #1. Since the base station has received the preamble in the PRACH occasion of 3-32, it may be known that the terminal has selected SSB #1 and transmitted the preamble, and therefore data may be transmitted or received via a corresponding beam when subsequent random access is performed.

Even when the terminal in the connected state moves from a current (source) base station to a target base station due to handover, etc., the terminal performs random access to the target base station, and selects the SSB so as to transmit a random access preamble, as described above. In addition, during handover, a handover command is transmitted to the terminal so that the terminal moves from the source base station to the target base station, wherein the message may include a random access preamble identifier dedicated to the terminal for each SSB of the target base station, so that the dedicated random access preamble identifier may be used when random access is performed in the target base station. At this time, the base station may not allocate dedicated random access preamble identifiers for all beams (depending on a current position of the terminal, etc.), and thus dedicated random access preambles may not be allocated to some SSBs (for example, dedicated random access preambles are allocated only to beam #2 and beam #3). If a dedicated random access preamble is not allocated to an SSB selected for preamble transmission, the terminal may randomly select a contention-based random access preamble to perform random access. For example, in the drawing, the terminal is initially located in beam #1, to which a dedicated random access preamble is not allocated, and performs random access. However, after failure, when the random access preamble is transmitted again, a scenario, in which the terminal is located in beam #3, to which a dedicated random access preamble is allocated, so as to transmit the dedicated preamble, is possible. That is, if preamble re-transmission occurs even in one random access procedure, a contention-based random access procedure and a non-contention-based random access procedure may be performed depending on whether a dedicated random access preamble is allocated to the selected SSB at each preamble transmission.

Figure 4:
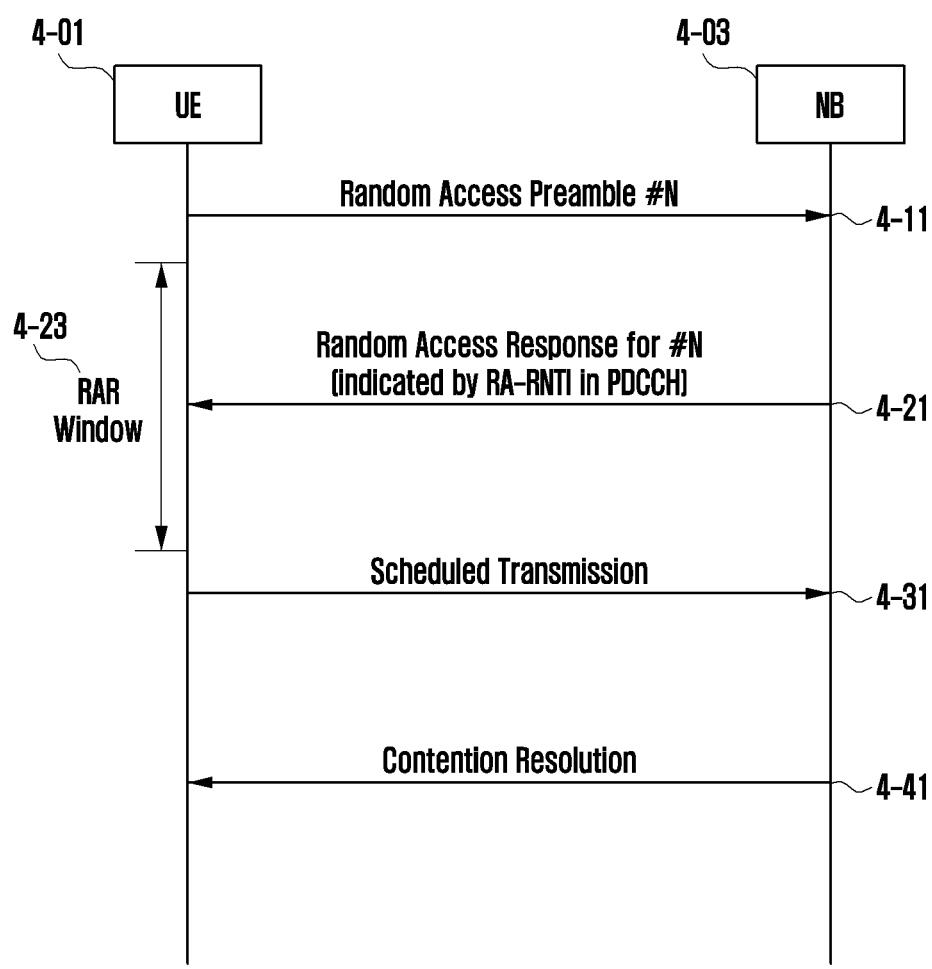
FIG. 4 is a diagram illustrating a procedure for performing, by a terminal, a contention-based 4-step random access to a base station according to an embodiment of the disclosure.

FIG. 4 is a diagram illustrating a procedure for performing, by a terminal, a contention-based 4-step random access to a base station according to an embodiment of the disclosure.

FIG. 4 is a diagram illustrating a contention-based 4-step random access procedure performed by a terminal in various cases requiring initial access, reconnection, handover, and other random accesses to a base station.

Referring to FIG. 4, in order to access a base station (Node B) 4-03, a terminal 4-01 selects a PRACH according to FIG. 3 described above, and transmits at operation 4-11 a random access preamble to the PRACH. One or more terminals may concurrently transmit a random access preamble via the PRACH resource. The PRACH resource may span one subframe, or only some symbols in one subframe may be used. Information on the PRACH resource may be included in system information that is broadcast by the base station, and therefore the terminal may identify a time frequency resource in which the preamble should be transmitted. In addition, the random access preamble corresponds to a specific sequence that enables reception even if transmission is performed before complete synchronization with the base station, and there may be multiple preamble identifiers (indices) according to the standard. If there are multiple preamble identifiers, the preamble transmitted by the terminal may be randomly selected by the terminal, or may be a specific preamble designated by the base station.

If the base station receives the preamble, a random access response (hereinafter, referred to as RAR) message is transmitted at operation 4-21 to the terminal. The RAR message may include at least one of identifier information of the preamble used in operation 4-11, uplink transmission timing correction information, uplink resource allocation information to be used in a later operation (i.e., 4-31), and temporary terminal identifier information. For example, if a plurality of terminals attempt random access by transmitting different preambles in operation 4-11, the identifier information of the preamble is transmitted to indicate a preamble, for which the RAR message is a response message. The uplink resource allocation information is detailed information of a resource to be used by the terminal in operation 4-31, and includes at least one of a physical location and size of the resource, a modulation and coding scheme (MCS) used during transmission, and power adjustment information during transmission. If the terminal having transmitted the preamble performs initial access, the terminal does not have an identifier for communication with the base station, which is allocated by the base station, and therefore the temporary terminal identifier information is a value transmitted to the terminal for use in communication with the base station.

The RAR message should be transmitted within a predetermined period starting from a predetermined time after transmission of the preamble, and the period is referred to as "RAR window" 4-23. The RAR window starts from a predetermined time after transmission of a first preamble. The predetermined time may have a subframe unit (1 ms) or a smaller value. A length of the RAR window may be a predetermined value configured by the base station specific to each PRACH resource or specific to one or more PRACH resource sets, within a system information message that is broadcast by the base station.

When the RAR message is transmitted, the base station schedules the RAR message via the PDCCH, and the scheduling information is scrambled using a random access-radio network temporary identifier (RA-RNTI). The RA-RNTI is mapped to the PRACH resource used to transmit the message in operation 4-11, and the terminal having transmitted a preamble to a specific PRACH resource attempts to receive the PDCCH on the basis of the RA-RNTI, and determines whether a corresponding RAR message exists. That is, if the RAR message is a response to the preamble transmitted by the terminal in operation 4-11 as shown in the diagram, the RA-RNTI used in the RAR message scheduling information includes information on the transmission in operation 4-11. To this end, the RA-RNTI may be determined based on information of the time resource or frequency resource in which the preamble has been transmitted, etc., and may be calculated, for example, by the following equation:

$$\text{RA-RNTI} = 1 + s\_id + 14 \times t\_id + 14 \times 80 \times f\_id + 14 \times 80 \times 8 \times \text{ul\_carrier\_id} \quad \text{Equation 1}$$

Here, s_id is an index corresponding to a first OFDM symbol at which preamble transmission performed in operation 4-11 is started, and has a value of $0 \leq s\_id < 14$ (that is, a maximum number of OFDM in one slot). Further, t_id is an index corresponding to a first slot in which preamble transmission performed in operation 4-11 is started, and has a value of $0 \leq t\_id < 80$ (that is, a maximum number of slots in one system frame (10 ms)). Further, fid indicates the order of PRACH resource on frequency, at which the preamble transmitted in operation 4-11 is transmitted, and has a value of $0 \leq f\_id < 8$ (that is, a maximum number of PRACHs on frequency within the same time). If two carriers are used in uplink for one cell, ul_carrier_id is a factor for distinguishing whether the preamble is transmitted in a normal uplink (UL) (NUL) (0 in this case) or whether the preamble is transmitted in a supplementary UL (SUL) (1 in this case).

The terminal having received the RAR message transmits 4-31 different messages to the resource allocated to the RAR message, according to the aforementioned various purposes. In the diagram, a third message is also referred to as Msg3 (that is, the preamble in operation 4-11 is referred to as Msg1, and RAR in operation 4-21 is also referred to as Msg2). As an example of Msg3 transmitted by the terminal, an RRCConnectionRequest message, which is a message of an RRC layer, is transmitted in a case of an initial connection, an RRCConnectionReestablishmentRequest message is transmitted in a case of a reconnection, and an RRCConnectionReconfigurationComplete message is transmitted during handover. Alternatively, a buffer status report (BSR) message for a resource request, etc. may be transmitted.

Thereafter, the terminal receives at operation 4-41 a contention resolution message from the base station for initial transmission (i.e., when Msg3 does not include information on a base station identifier previously allocated to the terminal, etc.). The contention resolution message includes a content transmitted by the terminal in Msg3 as it is, and thus even if there are a plurality of terminals having selected an identical preamble in operation 4-11, a terminal, to which the response is made, may be informed.

A contention resolution timer (ra-ContentionResolutionTimer) is started or restarted at a point in time when an uplink allocated for Msg3 transmission via the RAR or PDCCH ends (for example, a first OFDM symbol after the uplink). Accordingly, the terminal attempts to receive Msg4 from the base station until a timer expires, and if Msg4 is not received until the timer expires, the terminal determines that contention resolution has failed and retransmits the preamble.

The aforementioned 5G system may consider a scenario of performing operation in an unlicensed band. The unlicensed band may refer to a frequency band that may be freely used by anyone without a license within the regulatory permit at a corresponding frequency. For example, a frequency band includes a 2.4 GHz band, a 5 GHz band, or the like, and communication is performed using a corresponding frequency via wireless local area network (LAN), Bluetooth, etc.

In order to perform communication in an unlicensed band, data needs to be transmitted or received according to regulations determined for each country. More specifically, according to the regulations, before a communication device performs transmission in an unlicensed band, the communication device needs to "listen" and determine whether the unlicensed band is occupied by another communication device, and then perform "transmission" if the unlicensed band is determined to be vacant. This scheme of listening and performing transmission when an unlicensed band is vacant is referred to as listen-before-talk (LBT). Regulations that require the LBT to be performed for each country and each unlicensed band have been determined, and a communication device needs to perform LBT when performing communication in an unlicensed band in accordance with these regulations.

According to an embodiment of the disclosure, there may be two types of LBT: type 1 and type 2. However, the disclosure is not limited thereto.

Figure 5:
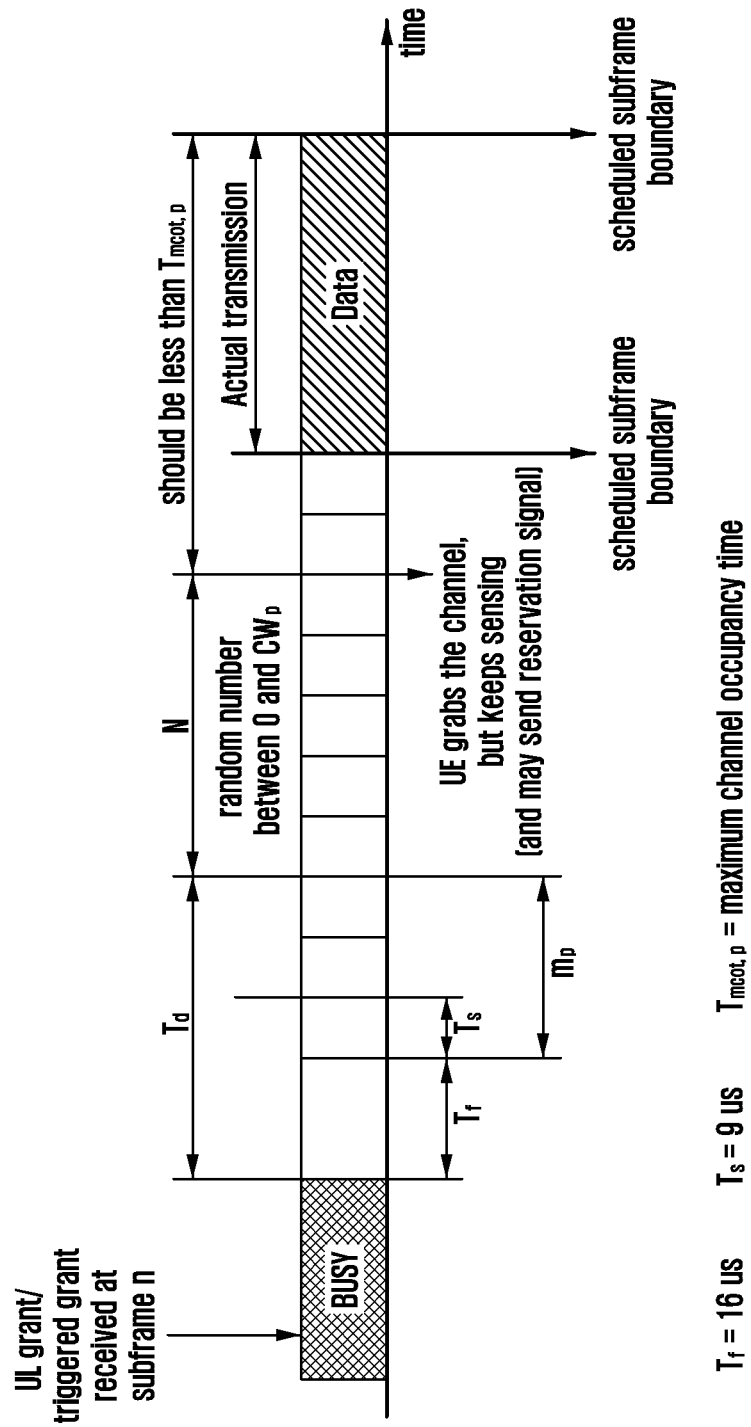
FIG. 5 is a diagram illustrating listen before talk (LBT) Type 1 according to an embodiment of the disclosure.

FIG. 5 is a diagram illustrating LBT Type 1 according to an embodiment of the disclosure.

Referring to FIG. 5, LBT type 1 is a method of randomly determining, before transmission, a time to listen whether other peripheral devices perform transmission, and performing transmission when a channel is vacant (not occupied) for a random time period. A communication device first listens whether a channel is vacant for a fixed time ($T_d$), and when the channel is vacant, determines again whether the channel is vacant for a random time period (N).

Here, a method of determining values of $T_d$ and N may be differentially determined according to priority and importance of traffic, etc., and in the embodiment, a total of four different classes are exemplified. The classes may be referred to as channel access priority classes (CAPCs).

According to the CAPC, a time length of $T_d = 16 + m_p * 9$ (μs) is obtained, and N=random (0, $CW_p$)*9 (μs) is obtained, wherein a CW value starts from $CW_{min,p}$, and at each time when transmission fails, the CW value increases and has a maximum value of $CW_{max,p}$. For example, if LBT is performed using a scheme in which the CAPC is 3, $T_d$ has a length of 16+3*9=43 μs, and a random value between 0 and 15 is selected for N in the case of initial transmission, wherein for example, if 7 is selected, N is 7*9=63 μs, and the communication device may transmit data when the channel is vacant for 106 μs.

TABLE 1

| Channel Access Priority Class ($P$) | $m_p$ | $CW_{min,p}$ | $CW_{max,p}$ | $T_{m\_cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the example (when 7 is selected for N), if it is determined that the channel is occupied by another device (that is, a received signal strength indicator (RSSI) is equal to or greater than a predetermined threshold value) in the middle of determining whether the channel is vacant (for example, in a case of 4 after passing 3 out of 7), the terminal waits until the end of the channel occupancy, waits for $T_d$ again, determines whether the channel is vacant for the remaining time period of 4, and then performs transmission. As shown in the table above, an LBT scheme having a low CAPC may be used when traffic having a high priority is transmitted.

Figure 6:
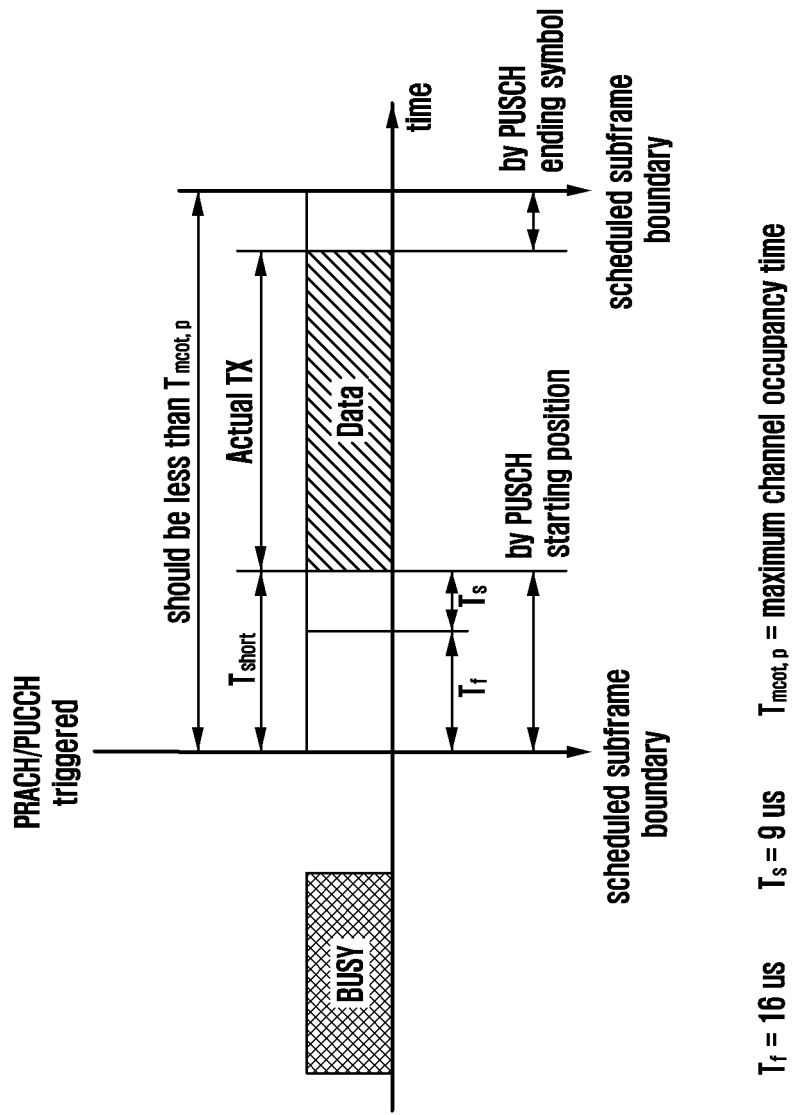
FIG. 6 is a diagram illustrating LBT type 2 according to an embodiment of the disclosure.

FIG. 6 is a diagram illustrating LBT type 2 according to an embodiment of the disclosure.

Referring to FIG. 6, LBT type 2 is a method in which a time to listen, before performing transmission, to whether other peripheral devices perform transmission is fixed, and therefore transmission is immediately performed when a channel is vacant for the fixed time period. That is, in the diagram, LBT type 2 is a scheme, in which when a communication device needs to perform transmission, the communication device listens to (senses) the channel for the fixed time period of $T_{short}$ (=$T_f$+$T_s$), and immediately transmits data if the channel is determined to be vacant. This is an LBT scheme that is available when a signal having a very high priority is transmitted. Accordingly, the aforementioned random access preamble (e.g., operation 4-11 of FIG. 4), the described PUCCH, and the like are signals having high importance and should be thus transmitted using the LBT scheme.

Figure 7:
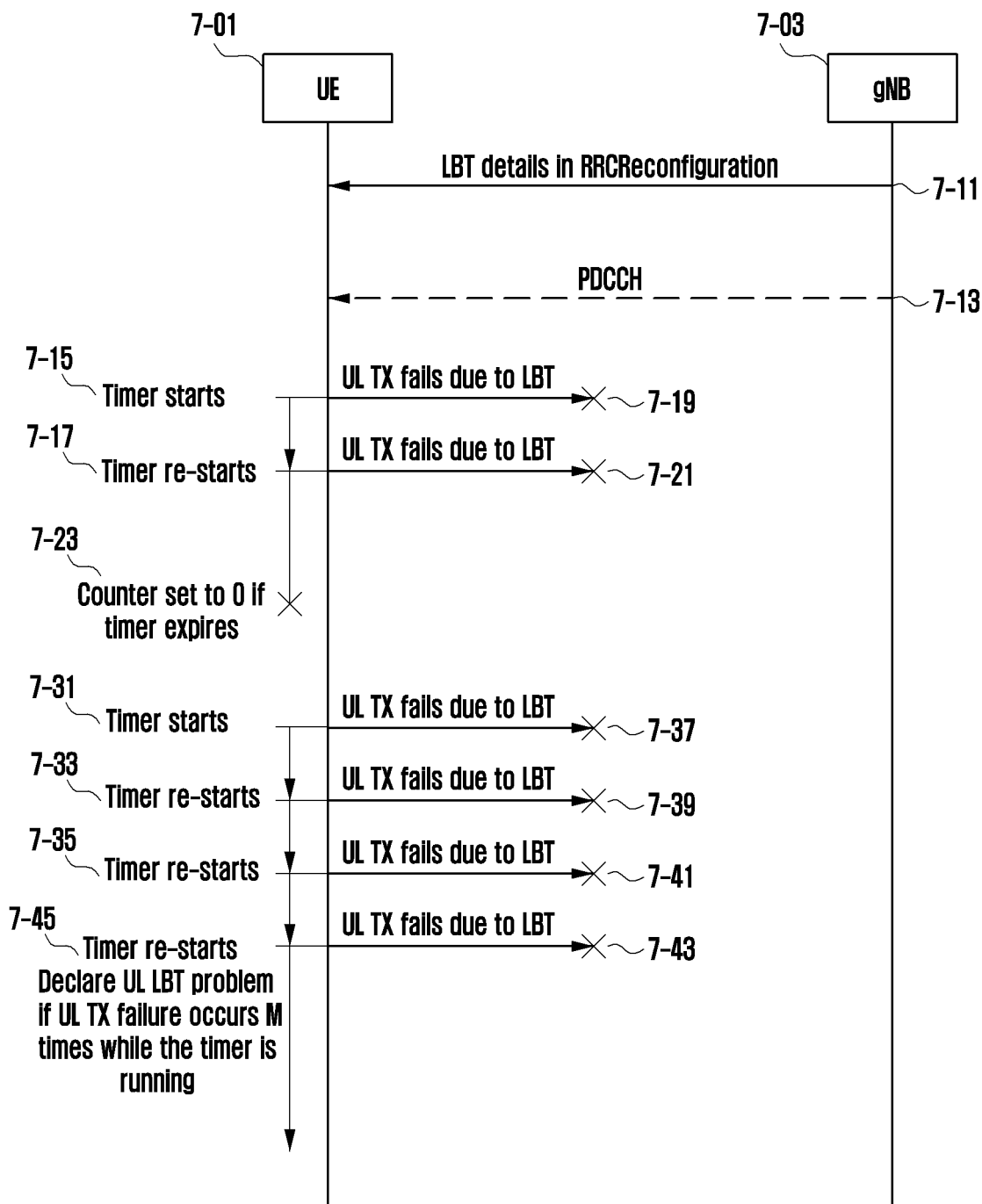
FIG. 7 is a diagram illustrating a procedure between a terminal and a base station when the terminal detects an uplink LBT failure problem according to an embodiment of the disclosure.

FIG. 7 is a diagram illustrating a procedure between a terminal and a base station when the terminal detects an uplink LBT failure problem according to an embodiment of the disclosure.

Referring to FIG. 7, it has been assumed that a terminal 7-01 accesses a base station 7-03 operating in an unlicensed band, and is thus in an RRC connected state (RRC_CONNECTED). In the RRC connected state, the terminal may transmit data to or receive data from the base station. The terminal may receive, from the base station, a configuration of a parameter related to uplink LBT problem detection, which will be described later, via an RRCReconfiguration message or an SIB message in operation 7-11.

Therefore, the terminal may receive 7-13 an uplink resource scheduled from the base station via a PDCCH, or may perform uplink transmission for performing random access, PUCCH transmission, data transmission to a configured uplink grant, and the like.

As described above, if data is transmitted in the unlicensed band, the terminal needs to perform an LBT operation, and may configure a type of LBT to be performed for each logic channel within the RRC message or for each corresponding uplink resource allocation in the PDCCH, and the terminal may perform LBT according to a configuration of a highest (or lowest) priority from among logic channels to which actually transmitted data belongs.

Accordingly, if the terminal is unable to perform transmission at operation 7-19 due to an LBT failure when performing uplink transmission, the terminal starts (drives) a timer (for example, lbt-FailureDetectionTimer) for LBT failure detection at operation 7-15. A length of the timer may be configured according to the RRCReconfiguration or SIB message. Each time at which LBT fails at operations 7-19 and 7-21, a predetermined counter is incremented, and the timer is restarted at operation 7-17. This is to allow the terminal to recognize, while the timer is running, the seriousness of an UL LBT problem and perform an additional operation when the counter reaches a value configured by the base station according to the RRCReconfiguration or SIB message.

Subsequently, if no failure occurs, until the timer expires, as many times as a value configured by the base station (for example, 4 times), the terminal determines that the uplink LBT problem no longer occurs, and sets the counter to 0 at operation 7-23.

As another example, if the terminal is unable to perform transmission at operation 7-37 due to the LBT failure at uplink transmission, the terminal starts the timer at operation 7-31. Thereafter, if the terminal has further attempted to perform uplink transmission, has continuously failed to perform transmission due to an UL LBT issue as in operations 7-39, 7-41, and 7-43, the time re-starts at operations 7-33 and 7-35, and the failure has occurred as many times as the number configured by the base station (for example, four times), the terminal recognizes that an uplink LBT problem enough to cause a problem in uplink transmission has occurred, and performs at operation 7-45 an additional procedure to solve the problem. The additional procedure may include: a procedure of transmitting an LBT failure MAC CE, in a case of a special cell (SpCell), switching to another bandwidth part (BWP) in another SpCell in which no LBT failure has occurred; or if an LBT failure has occurred in all BWPs, notifying of the occurrence of the LBT failure to an upper layer (RRC) by an MAC layer of the terminal, thereby causing the upper layer of the terminal to declare a radio link failure (RLF). If the radio link failure is declared, the terminal selects a cell having a strongest signal from among neighboring cells, and attempts to re-establish the connection (connection re-establishment).

Figure 8A:
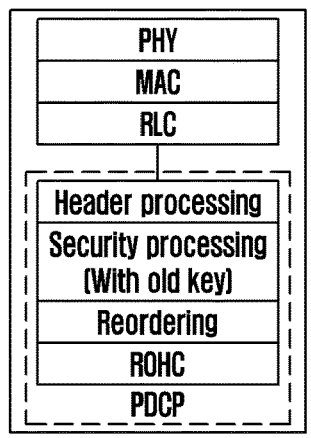
FIG. 8A is a diagram illustrating a procedure of using a dual active protocol stack (DAPS) while performing handover according to an embodiment of the disclosure.
Figure 8A:
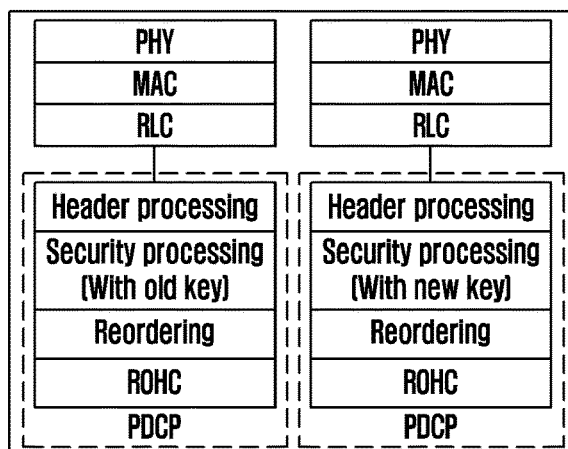
Figure 8A:
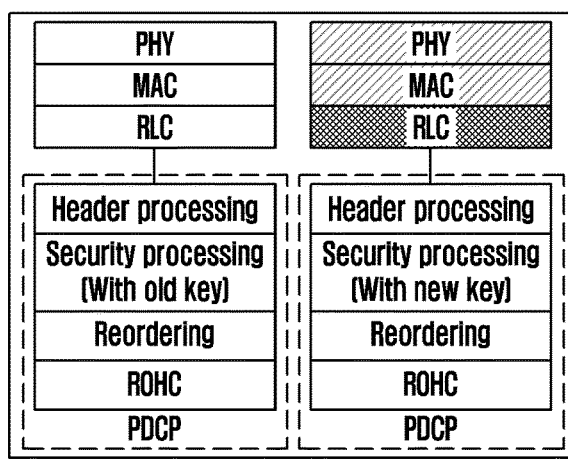
Figure 8B:
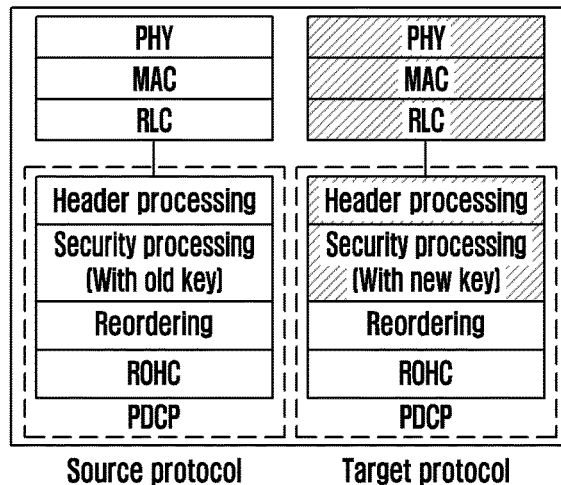
FIG. 8B a diagram illustrating a procedure of using a dual active protocol stack while performing handover according to an embodiment of the disclosure.
Figure 8B:
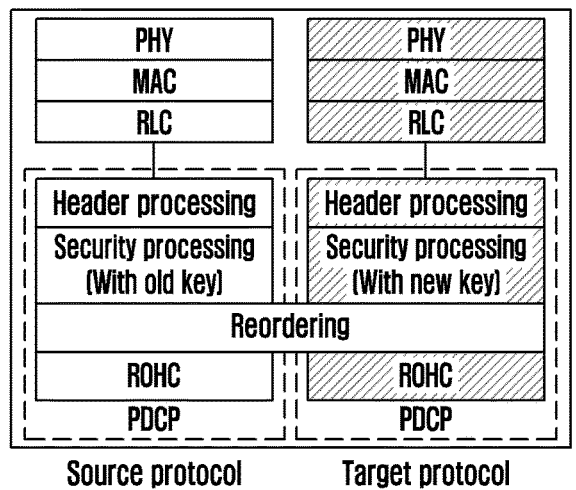
Figure 8B:
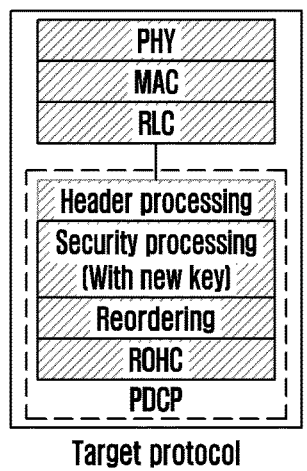

FIGS. 8A and 8B are diagrams illustrating a procedure of using a dual active protocol stack (DAPS) while performing handover according to various embodiments of the disclosure.

When a general handover is performed, the terminal stops transmitting data to or receiving data from a source cell when receiving handover configuration information, and starts transmitting data to or receiving data from a target cell after the handover procedure succeeds. Accordingly, an interruption time occurs, wherein the interruption time is a time period in which data transmission/reception cannot be performed. If the terminal has a dual active protocol stack, data transmission to and data reception from the source cell may be maintained as it is during the time period. In the disclosure, such a handover performed in consideration of terminal capability may be referred to as a dual active protocol stack (DAPS) handover. When the DAPS handover is configured, the terminal may receive downlink data concurrently from the source cell and the target cell only for data belonging to a data bearer for which the DAPS operation has been configured. The bearer is a logical data path, and the base station may configure multiple different bearers according to data types, and when there are multiple data bearers, the base station may configure a DAPS for each bearer. However, concurrent uplink data transmission to the source cell and the target cell may be possible only when a predetermined condition is satisfied due to a lack of terminal transmission power, signal interference, and the like. For example, in order to minimize terminal complexity, uplink data transmission during DAPS handover may be possible for only one link, and uplink in which data transmission is performed may be switched from the source cell to the target cell at a specific point in time.

At each major specific point in time, a terminal operation and an active state of the dual protocol stack corresponding to the source cell and the target cell are different.

Referring to FIG. 8A, before handover is performed at operation 8-05, the terminal uses only a protocol stack corresponding to the source cell.

Before DAPS handover configuration information is provided to the terminal and RACH is performed to the target cell at operation 8-10, if the DAPS handover configuration information is received via an RRCReconfiguration message, the terminal configures a protocol stack corresponding to the target cell. However, the terminal still uses only the protocol stack corresponding to the source cell. Even if the protocol stack corresponding to the target cell is inactive, it is irrelevant.

During the RACH performing period at operation 8-15, when the RACH operation starts, at least a PHY layer and a MAC layer are activated in the protocol stack corresponding to the target cell, so as to perform the RACH operation. At this time, the terminal still maintains data transmission to or data reception from the source cell.

Operations after operation 8-20 will be described with reference to FIG. 8B.

When a point in time at operation 8-20, at which the terminal transmits an HO success completion message (i.e., the RRCReconfigurationComplete message of the RRC layer) to the target cell, comes, the terminal should be able to process the handover success completion message transmitted via a signaling radio bearer, by activation of at least some functions of a PHY layer, a MAC layer, an RLC layer, and a PDCP layer in the protocol stack corresponding to the target cell. The terminal may transmit uplink data to the source cell at least before transmission of the HO success complete message to the target cell.

After receiving at operation 8-25 an RAR from the target cell, the terminal activates all the dual active protocol stacks. The terminal maintains data transmission to or data reception from the source cell until a specific point in time arrives after RAR reception. A point in time at which the terminal is able to maintain downlink data reception from the source cell may be different from a point in time at which the terminal is able to maintain uplink data transmission. The terminal is able to transmit uplink data to the source cell until the HO success completion message is transmitted to the target cell, but downlink data reception is possible even thereafter.

After the terminal releases at operation 8-30 the source cell, the protocol stack corresponding to the source cell is also released. From then on, the terminal uses only the protocol stack corresponding to the target cell.

Figure 9:
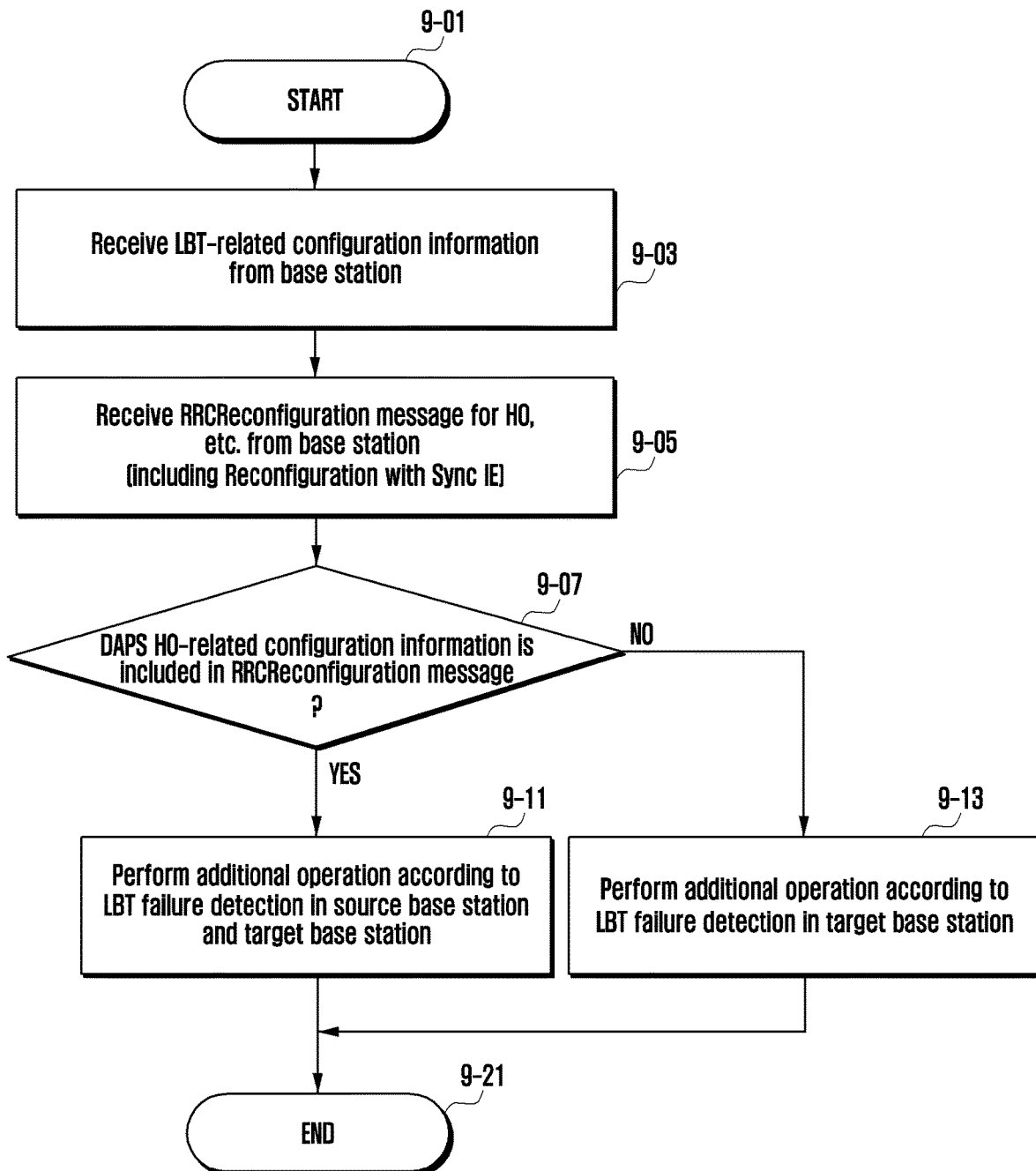
FIG. 9 is a diagram illustrating an operation sequence of a terminal when an LBT failure is detected during DAPS handover by the terminal according to an embodiment of the disclosure.

FIG. 9 is a diagram illustrating an operation sequence of a terminal when an LBT failure is detected during DAPS handover by the terminal according to an embodiment of the disclosure.

Referring to FIG. 9, it has been assumed at the start point 9-01 that a terminal accesses a base station operating in an unlicensed band, and is in an RRC connected state. In the RRC connected state, the terminal may transmit data to or receive data from the base station. The terminal may receive at operation 9-03, from the base station, a configuration of a parameter related to uplink LBT problem detection, which will be described later, via an RRCReconfiguration message or a system information block (SIB) message.

Thereafter, the terminal may receive at operation 9-05 a handover command for moving from the base station to another base station. The handover command may refer to a case in which a reconfigurationWithSync field is included in an RRCReconfiguration message of an RRC layer. The reconfigurationWithSync field may include identifier information of the terminal, which is to be used in a target base station, length information of a timer T304, which is used to detect a handover failure, and the like. The reconfigurationWithSync field may also optionally include information on a dedicated resource (the aforementioned dedicated random access preamble) that may be used during a random access procedure when accessing the target base station for the handover procedure.

In order to reduce a delay during the handover, the base station may indicate the aforementioned DAPS HO to the terminal. The DAPS HO is performed at operation 9-07 only when there is a bearer, in which a daps-Config field is configured to true, from among data bearers configured for the terminal. If the terminal operates in an unlicensed band, or if an LBT failure detection and recovery-related configuration is configured for the terminal, the base station may not configure the DAPS HO to the terminal. Since a delay may occur in operation in the unlicensed band due to various reasons, this is basically to prevent the use of a function such as the DAPS HO, which is used to reduce a handover delay, in the unlicensed band. However, nevertheless, in the embodiment, it may be assumed that the DAPS handover is configured to reduce a handover delay.

Accordingly, if, in a state where LBT failure detection is configured, DAPS HO-related configuration information is included in the RRCReconfiguration message, the terminal performs at operation 9-11 an additional operation according to LBT failure detection in the source base station and the target base station.

For example, if continuous LBT failure is also detected in the source base station during DAPS handover according to the procedure described in FIG. 7, the terminal may suspend transmission of data bearers (data radio bearers), for which DAPS is configured with the source base station, and may terminate the connection to the source base station.

This is expressed as a procedure of the 3GPP RRC standard as follows. (The underlined part is a change from the procedure of the existing 3GPP RRC standard.)

TABLE 2

5.3.10.3 Detection of radio link failure

The UE shall:
  1>if dapsConfig is configured for any DRB:
    2>upon T310 expiry in source; or
    2>upon random access problem indication from source MCG MAC; or
    2>upon indication from source MCG RLC that the maximum number of retransmissions has been reached; or
    2>upon indication of consistent uplink LBT failures from source MCG MAC:
      3>consider radio link failure to be detected for the source MCG, i.e., source RLF;
        4>suspend all DRBs in the source;
        4>release the source connection.

TABLE 2-continued 5.3.10.3 Detection of radio link failure

```
1>else:
    2>upon T310 expiry in PCell; or
    2>upon T312 expiry in PCell; or
    2>upon random access problem indication from MCG MAC while
        neither T300, T301, T304, T311 nor T319 are running; or
    2>upon indication from MCG RLC that the maximum number of
        retransmissions has been reached; or
    2>if connected as an IAB-node, upon BH RLF indication received on
        BAP entity from the MCG; or
    2>upon indication of consistent uplink LBT failures from MCG
        MAC:
        3>if the indication is from MCG RLC and CA duplication is
            configured and activated, and for the corresponding logical
            channel allowedServingCells only includes SCell(s):
            4>initiate the failure information procedure as specified in
                5.7.5 to report RLC failure.
        3>else:
            4>consider radio link failure to be detected for the MCG,
                i.e., RLF;
...
```

An LBT failure may occur during DAPS handover also in the target base station. Accordingly, when continuous LBT failure is also detected in the target base station according to the procedure described in FIG. 7, the following methods may be exemplified as a method available for the terminal.

A first method is to ignore even if an LBT failure is detected in the target base station during DAPS HO, and wait for expiration of T304 which is used to detect a general handover failure.

In a second method, when an LBT failure is detected in the target base station during DAPS HO, the terminal considers that the handover has failed, and performs, in advance, operations (i.e., operations performed when the handover is not completed until T304 expires) which are performed when the handover failure occurs. The operations performed when the handover fails may include releasing a dedicated random access resource configured for the handover, returning the terminal configuration to the configuration previously configured by the source base station, and performing RRC connection re-establishment. The RRC connection re-establishment is performed by selecting a neighboring accessible cell and performing random access to the selected cell (including RRCReestablishmentRequest message transmission). When the RRC connection re-establishment is performed, the terminal may inform that there is connection failure information to be reported to the base station, by including a connEstFailInfoAvailable field in an RRCReestablishmentComplete message. Accordingly, in order for the base station to obtain the information, if the base station requests the information from the terminal by configuring rlf-ReportReq to true in a UEInformationRequest message, the terminal reports details of RLFs that have occurred previously to the base station by using an rlf-Report field in a UEInformationResponse message. Since a problem has occurred during the handover, the terminal may report that the cause of the connection failure (connectionFailureType) is occurrence of the handover failure (hof). In the detailed cause of the handover failure (hof-Cause), it may be notified that the handover has failed due to the LBT failure (lbt-Failure). Alternatively, in the case of the LBT failure, even if the connection failure has occurred due to the handover failure, it may be notified that the connection failure has occurred due to an RLF rather than due to the handover failure (i.e., configuring a connectionFailureType field to rlf), and in this case, for a cause of the RLF (rlf-Cause), it may be notified that the RLF has occurred due to the LBT failure (lbt-Failure).

This is expressed as a procedure of the 3GPP RRC standard as follows. (The underlined parts are changes from the standard of the existing 3GPP RRC standard procedure.)

TABLE 3

5.3.10.3 Detection of radio link failure

```
The UE shall:
    1>if dapsConfig is configured for any DRB:
        2>upon T310 expiry in source; or
        2>upon random access problem indication from source MCG MAC;
            or
        2>upon indication from source MCG RLC that the maximum number
            of retransmissions has been reached:
            3>consider radio link failure to be detected for the source MCG,
                i.e., source RLF;
                4>suspend all DRBs in the source;
                4>release the source connection.
        2>upon indication of consistent uplink LBT failures from target MCG
            MAC:
            3>perform the operation as specified in subclause 5.3.5.8.3, i.e.,
                T304 expiry (Reconfiguration with sync Failure).
    1>else:
        2>upon T310 expiry in PCell; or
        2>upon T312 expiry in PCell; or
        2>upon random access problem indication from MCG MAC while
            neither T300, T301, T304, T311 nor T319 are running; or
        2>upon indication from MCG RLC that the maximum number of
            retransmissions has been reached; or
        2>if connected as an IAB-node, upon BH RLF indication received on
            BAP entity from the MCG; or
        2>upon indication of consistent uplink LBT failures from MCG
            MAC:
            3>if the indication is from MCG RLC and CA duplication is
                configured and activated, and for the corresponding logical
                channel allowedServingCells only includes SCell(s):
                4>initiate the failure information procedure as specified in 5.7.5
                    to report RLC failure.
            3>else:
                4>consider radio link failure to be detected for the MCG,
                    i.e., RLF;
...
```

TABLE 4

5.3.5.8.3 T304 expiry (Reconfiguration with sync Failure)

```
...
The UE shall:
    1>if T304 of the MCG expires or upon indication of consistent uplink
        LBT failures from target MCG MAC:
        2>release dedicated preambles provided in rach-ConfigDedicated if
            configured;
        2>release dedicated msgA PUSCH resources provided in rach-
            ConfigDedicated if configured;
        2>store the following handover failure information in VarRLF-Report
            by setting its fields as follows:
            3>clear the information included in VarRLF-Report, if any;
            3>set the plmn-IdentityList to include the list of EPLMNs stored
by
            the UE (i.e., includes the RPLMN);
            3>set the measResultLastServCell to include the RSRP, RSRQ and
                the available SINR, of the source PCell based on the available
                and SSB CSI-RS measurements collected up to the moment the
                UE detected handover failure;
            3>set the ssbRLMConfigBitmap and/or csi-rsRLMConfigBitmap in
                measResultLastServCell to include the radio link monitoring
                configuration of the source PCell;
            3>for each of the configured measObjectNR in which
                measurements are available;
                4>if the SS/PBCH block-based measurement quantities are
                    available;
```

TABLE 4-continued 5.3.5.8.3 T304 expiry (Reconfiguration with sync Failure)

5>set the measResultListNR in measResultNeighCells to include all the available measurement quantities of the best measured cells associated to the measObjectNR, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected handover failure;
      6>for each neighbour cell included, include the optional that are available;
    4>if the CSI-RS based measurement quantities are available;
     5>set the measResultListNR in measResultNeighCells to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected handover failure;
      6>for each neighbour cell included, include the optional fields that are available;
  3>for each of the configured EUTRA frequencies in which measurements are available;
    4>set the measResultListEUTRA in measResultNeighCells to include the best measured cells ordered such that the cell with highest RSRP is listed first if RSRP measurement results are available, otherwise the cell with highest RSRQ is listed first, and based on measurements collected up to the moment the UE detected radio link failure;
     5>for each neighbour cell included, include the optional fields that are available;
NOTE 0: The measured quantities are filtered by the L3 filter as configured in the mobility measurement configuration. The measurements are based on the time domain measurement resource restriction, if configured. Blacklisted cells are not required to be reported.
  3>if detailed location information is available, set the content of the LocationInfo as follows:
    4>if available, set the commonLocationInfo to include the detailed location information;
    4>if available, set the bt-LocationInfo to include the Bluetooth measurement results, in order of decreasing RSSI for Bluetooth beacons;
    4>if available, set the wlan-LocationInfo to include the WLAN measurement results, in order of decreasing RSSI for WLAN APs;
    4>if available, set the sensor-LocationInfo to include the sensor measurement results;
  3>set the failedPCellId to the global cell identity and tracking area code, if available, and otherwise to the physical cell identity and carrier frequency of the target PCell of the failed handover;
  3>include previousPCellId and set it to the global cell identity and tracking area code of the PCell where the last RRCReconfiguration message including reconfigurationWithSync was received;
  3>set the timeConnFailure to the elapsed time since reception of the last RRCReconfiguration message including the reconfigurationWithSync;
  3>set the connectionFailureType to hof;
  3>if T304 of the MCG expires:
    4>set the hof-Cause to t304-Expiry.
  3>else (i.e., upon indication of consistent uplink LBT failures from target MCG MAC):
    4>set the hof-Cause to lbt-Failure.
  3>set the c-RNTI to the C-RNTI used in the source PCell;
  3>set the absoluteFrequencyPointA to indicate the absolute frequency of the reference resource block associated to the random-access resources;
  3>set the locationAndBandwidth and subcarrierSpacing associated to the UL BWP of the random-access resources;
  3>set the msg1-FrequencyStart, msg1-FDM and msg1-SubcarrierSpacing associated to the random-access resources;
    3>set perRAInfoList to indicate random access failure information as specified in 5.3.10.3;
  2>if dapsConfig is configured for any DRB, and radio link failure is not detected in the source PCell, according to subclause 5.3.10.3:
    3>release target PCell configuration;
    3>reset target MAC and release the target MAC configuration;
    3>for each DRB with a DAPS PDCP entity:
     4>release the RLC entity and the associated logical channel for the target;
     4>reconfigure the PDCP entity to normal PDCP as specified in TS 38.323 [5];
    3>for each SRB:
     4>if the masterKeyUpdate was not received:
      5>configure the PDCP entity for the source with the same state variables as the PDCP entity for the target;
     4>release the PDCP entity for the target;
     4>release the RLC entity and the associated logical channel for the target;
    3>release the physical channel configuration for the target;
    3>revert back to the SDAP configuration used in the source;
    3>discard the keys used in target (the $K_{gNB}$ key, the $S\text{-}K_{gNB}$ key, the $S\text{-}K_{eNB}$ key, the $K_{RRCenc}$ key, the $K_{RRCint}$ key, the $K_{UPint}$ key and the $K_{UPenc}$ key), if any;
    3>resume suspended SRBs in the source;
    3>for each DRB without a DAPS PDCP entity:
     4>revert back to the UE configuration used for the DRB in the source, includes PDCP, RLC states variables, the security configuration and the data stored in transmission and reception buffers in PDCP and RLC entities;
    3>revert back to the UE RRIVI configuration used in the source;
    3>initiate the failure information procedure as specified in subclause 5.7.5 to report DAPS handover failure.
  2>else:
    3>revert back to the UE configuration used in the source PCell;
    3>initiate the connection re-establishment procedure as specified in subclause 5.3.7.
NOTE 1: In the context above, "the UE configuration" includes state variables and parameters of each radio bearer.
1>else if T304 of a secondary cell group expires:
  2>if MCG transmission is not suspended:
    3>release dedicated preambles provided in rach-ConfigDedicated, if configured;
    3>initiate the SCG failure information procedure as specified in subclause 5.7.3 to report SCG reconfiguration with sync failure, upon which the RRC reconfiguration procedure ends;
  2>else:
    3>initiate the connection re-establishment procedure as specified in subclause 5.3.7;
1>else if T304 expires when RRCReconfiguration is received via other RAT (HO to NR failure):
  2>reset MAC;
  2>perform the actions defined for this failure case as defined in the specifications applicable for the other RAT.

If the LBT failure occurs in the target base station as described above, when the terminal performs cell selection for a connection reconfiguration, re-occurrence of the same problem may be prevented by selecting a cell other than the target base station.

If, in a state where LBT failure detection is configured, the DAPS HO-related configuration information is not included in the RRCReconfiguration message, the terminal performs 9-13 only an additional operation according to the LBT failure detection in the target base station. Accordingly, when continuous LBT failure is detected also in the target base station according to the procedure described in FIG. 7, even if the LBT failure is detected in the target base station, the terminal may ignore the detection, and may wait for the expiration of T304, which is used to detect a general handover failure. That is, while T304 is running, even if the continuous LBT failure is detected, the detection may be ignored, and no additional operation may be performed.

This is expressed as a procedure of the 3GPP RRC standard as follows. (The underlined part is a change from the procedure of the existing 3GPP RRC standard.)

TABLE 5

5.3.10.3 Detection of radio link failure

The UE shall:
1>if dapsConfig is configured for any DRB:
  2>upon T310 expiry in source; or
  2>upon random access problem indication from source MCG MAC; or
  2>upon indication from source MCG RLC that the maximum number of retransmissions has been reached:
    3>consider radio link failure to be detected for the source MCG, i.e., source RLF;
      4>suspend all DRBs in the source;
      4>release the source connection.
1>else:
  2>upon T310 expiry in PCell; or
  2>upon T312 expiry in PCell; or
  2>upon random access problem indication from MCG MAC while neither T300, T301, T304, T311 nor T319 are running; or
  2>upon indication from MCG RLC that the maximum number of retransmissions has been reached; or
  2>if connected as an IAB-node, upon BH RLF indication received on BAP entity from the MCG; or
  2>upon indication of consistent uplink LBT failures from MCG MAC while T304 is not running:
    3>if the indication is from MCG RLC and CA duplication is configured and activated, and for the corresponding logical channel allowedServingCells only includes SCell(s):
      4>initiate the failure information procedure as specified in 5.7.5 to report RLC failure.

TABLE 5-continued 5.3.10.3 Detection of radio link failure

3>else:
      4>consider radio link failure to be detected for the MCG, i.e., RLF;
...

In the procedure of the RRC standard, if DAPS is not configured (i.e., 1> else: hereinafter), both a case of performing a general handover (i.e., occurrence of the LBT failure during handover) and a case of performing no handover (i.e., occurrence of the LBT failure during communication with one base station) are included. Accordingly, operations of the two cases may be differentiated. For example, in the case of performing no handover (i.e., when T304 is started by receiving a handover command from the base station), the terminal considers, after detecting the LBT failure, that the handover has failed, and the terminal does not wait until the expiration of T304, and performs operations (i.e., operations performed when the handover is not completed until T304 expires) which are performed when the handover failure occurs, in advance. The operations performed when the handover fails may include releasing a dedicated random access resource configured for the handover, returning the terminal configuration to the configuration previously configured by the source base station, and performing RRC connection re-establishment. The RRC connection re-establishment is performed by selecting a neighboring accessible cell and performing random access to the selected cell (including RRCReestablishmentRequest message transmission).

This is expressed as a procedure of the 3GPP RRC standard as follows. (The underlined part is a change from the procedure of the existing 3GPP RRC standard.)

TABLE 6

5.3.10.3 Detection of radio link failure

The UE shall:
1>if dapsConfig is configured for any DRB:
  2>upon T310 expiry in source; or
  2>upon random access problem indication from source MCG MAC; or
  2>upon indication from source MCG RLC that the maximum number of retransmissions has been reached:
    3>consider radio link failure to be detected for the source MCG, i.e., source RLF;
      4>suspend all DRBs in the source;
      4>release the source connection.
1>else:
  2>upon T310 expiry in PCell; or
  2>upon T312 expiry in PCell; or
  2>upon random access problem indication from MCG MAC while neither T300, T301, T304, T311 nor T319 are running; or
  2>upon indication from MCG RLC that the maximum number of retransmissions has been reached; or
  2>if connected as an IAB-node, upon BH RLF indication received on BAP entity from the MCG; or
  2>upon indication of consistent uplink LBT failures from MCG MAC while T304 is not running:
    3>if the indication is from MCG RLC and CA duplication is configured and activated, and for the corresponding logical channel allowedServingCells only includes SCell(s):
      4>initiate the failure information procedure as specified in 5.7.5 to report RLC failure.
    3>else:
      4>consider radio link failure to be detected for the MCG, i.e., RLF;
      4>discard any segments of segmented RRC messages received;
      4>store the following radio link failure information in the VarRLF-Report by setting its fields as follows:

TABLE 6-continued 5.3.10.3 Detection of radio link failure

5>clear the information included in VarRLF-Report, if any;
     5>set the plmn-IdentityList to include the list of EPLMNs stored
       by the UE (i.e., includes the RPLMN);
     5>set the measResultLastServCell to include the RSRP, RSRQ
       and the available SINR, of the source PCell based on the
       available SSB and CSI-RS measurements collected up to the
       moment the UE detected radio link failure;
     5>set the ssbRLMConfigBitmap and/or csi-rsRLMConfigBitmap
       in measResultLastServCell to include the radio link monitoring
       configuration of the source PCell;
     5>for each of the configured NR frequencies in which
       measurements are available:
       6>if the SS/PBCH block-based measurement quantities are
         available:
         7>set the measResultListNR in measResultNeighCells to
           include all the available measurement quantities of the
           best measured cells, other than the source PCell, ordered
           such that the cell with highest SS/PBCH block RSRP is
           listed first if SS/PBCH block RSRP measurement results
           are available, otherwise the cell with highest SS/PBCH
           block RSRQ is listed first if SS/PBCH block RSRQ
           measurement results are available, otherwise the cell with
           highest SS/PBCH block SINR is listed first, based on the
           available SS/PBCH block based measurements collected
           up to the moment the UE detected radio link failure;
         8>for each neighbour cell included, include the optional
           fields that are available;
       6>if the CSI-RS based measurement quantities are available:
         7>set the measResultListNR in measResultNeighCells to
           include all the available measurement quantities of the
           best measured cells, other than the source PCell, ordered
           such that the cell with highest CSI-RS RSRP is listed
           first if CSI-RS RSRP measurement results are available,
           otherwise the cell with highest CSI-RS RSRQ is listed
           first if CSI-RS RSRQ measurement results are available,
           otherwise the cell with highest CSI-RS SINR is listed
           first, based on the available CSI-RS based measurements
           collected up to the moment the UE detected radio link
           failure;
         8>for each neighbour cell included, include the optional
           fields that are available;
     5>for each of the configured EUTRA frequencies in which
       measurements are available:
       6>set the measResultListEUTRA in measResultNeighCells to
         include the best measured cells ordered such that the cell
         with highest RSRP is listed first if RSRP measurement
         results are available, otherwise the cell with highest RSRQ
         is listed first, and based on measurements collected up to
         the moment the UE detected radio link failure;
NOTE: The measured quantities are filtered by the L3 filter as configured in
     the mobility measurement configuration. The measurements are
     based on the time domain measurement resource restriction, if
     configured. Blacklisted cells are not required to be reported.
     5>if detailed location information is available, set the content of
       locationInfo as follows:
       6>if available, set the commonLocationInfo to include the
         detailed location information;
       6>if available, set the bt-LocationInfo in locationInfo to
         include the Bluetooth measurement results, in order of
         decreasing RSSI for Bluetooth beacons;
       6>if available, set the wlan-LocationInfo in locationInfo to
         include the WLAN measurement results, in order of
         decreasing RSSI for WLAN APs;
       6>if available, set the sensor-LocationInfo in locationInfo to
         include the sensor measurement results;
     5>set the failedPCellId to the global cell identity and the tracking
       area code, if available, and otherwise to the physical cell
       identity and carrier frequency of the PCell where radio link
       failure is detected;
     5>if an RRCReconfiguration message including the
       reconfiguration WithSync was received before the connection
       failure:
       6>if the last RRCReconfiguration message including the
         reconfiguration WithSync concerned an intra NR handover:
         7>include the previousPCellId and set it to the global cell
           identity and the tracking area code of the PCell where the
           last RRCReconfiguration message including
           reconfiguration WithSync was received;

TABLE 6-continued 5.3.10.3 Detection of radio link failure

7>set the timeConnFailure to the elapsed time since reception of the last RRCReconfiguration message including the reconfigurationWithSync;
    5>set the connectionFailureType to rlf;
    5>set the c-RNTI to the C-RNTI used in the PCell;
    5>set the rlf-Cause to the trigger for detecting radio link failure;
    5>if the rlf-Cause is set to randomAccessProblem or beamFailureRecoveryFailure:
       6>set the absoluteFrequencyPointA to indicate the absolute frequency of the reference resource block associated to the random-access resources;
       6>set the locationAndBandwidth and subcarrierSpacing associated to the UL BWP of the random-access resources;
       6>set the msg1-FrequencyStart, msg1-FDM and msg1-SubcarrierSpacing associated to the random-access resources;
       6>set the parameters associated to individual random-access attempt in the chronological order of attempts in the perRAInfoList as follows:
          7>if the random-access resource used is associated to a SS/PBCH block, set the associated random-access parameters for the successive random-access attempts associated to the same SS/PBCH block for one or more random-access attempts as follows:
              8>set the ssb-Index to include the SS/PBCH block index associated to the used random-access resource;
              8>set the numberOfPreamblesSentOnSSB to indicate the number of successive random access attempts associated to the SS/PBCH block;
              8>for each random-access attempt performed on the random-access resource, include the following parameters in the chronological order of the random-access attempt:
                  9>if contention resolution was not successful as specified in TS 38.321 [6] for the transmitted preamble:
                     10>   set the contentionDetected to true;
                  9>else:
                     10>   set the contentionDetected to false;
                  9>if the SS/PBCH block RSRP of the SS/PBCH block corresponding to the random-access resource used in the random-access attempt is above rsrp-ThresholdSSB:
                     10>   set the dlRSRPAboveThreshold to true;
                  9>else:
                     10>   set the dlRSRPAboveThreshold to false;
          7>else if the random-access resource used is associated to a CSI-RS, set the associated random-access parameters for the successive random-access attempts associated to the same CSI-RS for one or more random-access attempts as follows:
              8>set the csi-RS-Index to include the CSI-RS index associated to the used random-access resource;
              8>set the numberOfPreamblesSentOnCSI-RS to indicate the number of successive random-access attempts associated to the CSI-RS;
              8>for each random-access attempt performed on the random-access resource, include the following parameters in the chronological order of the random-access attempt:
                  9>if contention resolution was not successful as specified in TS 38.321 [6] for the transmitted preamble:
                     10>   set the contentionDetected to true;
                  9>else:
                     10>   set the contentionDetected to false;
                  9>if the CSI-RS RSRP of the CSI-RS corresponding to the random-access resource used in the random-access attempt is above rsrp-ThresholdCSI-RS:
                     10>   set the dlRSRPAboveThreshold to true;
                  9>else:
                     10>   set the dlRSRPAboveThreshold to false;
4>if AS security has not been activated:
    5>perform the actions upon going to RRC_IDLE as specified in 5.3.11, with release cause 'other';

TABLE 6-continued 5.3.10.3 Detection of radio link failure

```
4>else if AS security has been activated but SRB2 and at least one
    DRB have not been setup:
    5>perform the actions upon going to RRC_IDLE as specified in
        5.3.11, with release cause 'RRC connection failure';
        Editor's note: FFS if the check for SRB2 activation and the setup
        of one DRB is applicable to IAB nodes.
4>else:
    5>if T316 is configured; and
    5>if SCG transmission is not suspended; and
    5>if PSCell change is not ongoing (i.e., timer T304 for the NR
        PSCell is not running in case of NR-DC or timer T307 of the
        E-UTRA PSCell is not running as specified in TS 36.331 [10],
        clause 5.3.10.10, in NE-DC):
        6>initiate the MCG failure information procedure as specified
            in 5.7.3b to report MCG radio link failure.
    5>else:
        6>initiate the connection re-establishment procedure as
            specified in 5.3.7.
2> upon indication of consistent uplink LBT failures from MCG MAC
    while T304 is running:
    3> consider T304 to be expired and perform the operation as specified
        in 5.3.5.8.3.
```

In both of the aforementioned procedures 9-11 and 9-13, when the LBT failure occurs in the target base station during the handover, if the terminal wants to ignore occurrence of the LBT failure, the terminal may change the LBT failure detection procedure method described in FIG. 7, so as not to notify an RRC layer of the occurrence of the LBT failure. The procedure then concludes at operation 9-21.

In a first method for this, a MAC layer of the terminal does not trigger the continuous LBT failure and does not perform an additional procedure even if the number of LBT failures in SpCell reaches a threshold value during the handover (i.e., while T304 is running; or during the random access procedure for Reconfiguration with sync).

This is expressed as a procedure of the 3GPP MAC standard as follows. (The underlined part is a change from the procedure of the existing 3GPP MAC standard.)

TABLE 7

5.21.2 LBT failure detection and recovery procedure

```
...
For each activated Serving Cell configured with lbt-FailureRecovery-
Config, the MAC entity shall:
    1>if LBT failure indication has been received from lower layers:
        2>start or restart the lbt-FailureDetectionTimer;
        2>increment LBT_COUNTER by 1;
        2>if LBT_COUNTER >= lbt-FailureInstanceMaxCount:
            3>if this Serving Cell is not the SpCell; or
            3>if this Serving Cell is the SpCell and T304 is not running:
            4 3>  trigger consistent LBT failure for the active UL BWP in
                this Serving Cell;
            4 3>  if this Serving Cell is the SpCell:
                5 4>    if consistent LBT failure has been triggered in all UL
                    BWPs configured with PRACH occasions on same carrier in
                    this Serving Cell:
                    6 5>   indicate consistent LBT failure to upper layers.
                5 4>    else:
                    6 5>   stop any ongoing Random Access procedure in this
                        Serving Cell;
                    6 5>   switch the active UL BWP to an UL BWP, on
                        same carrier in this Serving Cell, configured with
PRACH
                        occasion and for which consistent LBT failure has not
                        been triggered;
                    6 5>   initiate a Random Access Procedure (as specified
in
                        clause 5.1.1).
```

TABLE 7-continued 5.21.2 LBT failure detection and recovery procedure

```
1>if the lbt-FailureDetectionTimer expires; or
1>if lbt-FailureDetection Timer or lbt-FailureInstanceMaxCount is
    reconfigured by upper layers:
    2>set LBT_COUNTER to 0.
...
```

In a second method, if the number of LBT failures in the SpCell reaches the threshold value during the handover (i.e., while T304 is running; or during the random access procedure for Reconfiguration with sync), the MAC layer of the terminal triggers the continuous LBT failure, but does not notify the RRC layer (upper layer) of the same, so as to avoid an additional procedure.

This is expressed as a procedure of the 3GPP MAC standard as follows. (The underlined part is a change from the procedure of the existing 3GPP MAC standard.)

TABLE 8

5.21.2 LBT failure detection and recovery procedure

```
...
For each activated Serving Cell configured with lbt-FailureRecovery-
Config, the MAC entity shall:
    1>if LBT failure indication has been received from lower layers:
        2>start or restart the lbt-FailureDetectionTimer;
        2>increment LBT_COUNTER by 1;
        2>if LBT_COUNTER >= lbt-FailureInstanceMaxCount:
            3>trigger consistent LBT failure for the active UL BWP in this
                Serving Cell;
            3>if this Serving Cell is the SpCell, and T304 is not running:
                4>if consistent LBT failure has been triggered in all UL BWPs
                    configured with PRACH occasions on same carrier in this
                    Serving Cell:
                    5>indicate consistent LBT failure to upper layers.
                4>else:
                    5>stop any ongoing Random Access procedure in this Serving
                        Cell;
                    5>switch the active UL BWP to an UL BWP, on same carrier
                        in this Serving Cell, configured with PRACH occasion and
                        for which consistent LBT failure has not been triggered;
                    5>initiate a Random Access Procedure (as specified in clause
                        5.1.1).
```

TABLE 8-continued 5.21.2 LBT failure detection and recovery procedure

1>if the lbt-FailureDetectionTimer expires; or
1>if lbt-FailureDetectionTimer or lbt-FailureInstanceMaxCount is
  reconfigured by upper layers:
  2>set LBT_COUNTER to 0.
...

Although not described in the drawing, another method may be considered, wherein, in the other method, a physical layer does not send an LBT failure indication to the MAC layer during the handover. That is, in a procedure of the MAC standard, the procedure of "1> if LBT failure indication has been received from lower layers:" may be prevented from being executed.

According to the procedure, the terminal may perform a handover procedure in the case of DAPS configuration and LBT failure detection. Only one of the aforementioned embodiments may be used, or multiple embodiments may be concurrently applied and used.

Figure 10:
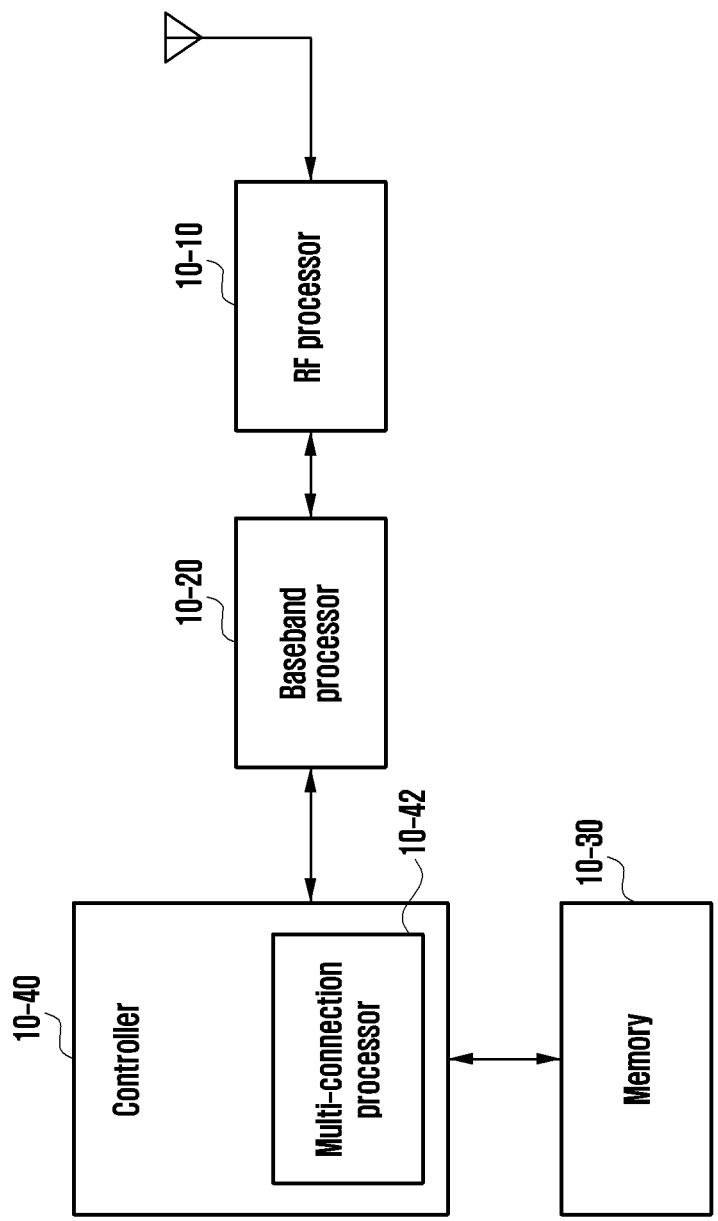
FIG. 10 illustrates a block diagram of a terminal in a wireless communication system according to an embodiment of the disclosure.

FIG. 10 illustrates a block diagram of a terminal in the wireless communication system according to an embodiment of the disclosure.

Referring to FIG. 10, the terminal includes a radio frequency (RF) processor 10-10, a baseband processor 10-20, a memory 10-30, and a controller 10-40.

The RF processor 10-10 performs a function for transmitting or receiving a signal via a radio channel, such as band conversion and amplification of the signal. That is, the RF processor 10-10 up-converts a baseband signal provided from the baseband processor 10-20 into an RF band signal, transmits the converted RF band signal via an antenna, and then down-converts the RF band signal received via the antenna into a baseband signal. For example, the RF processor 10-10 may include a transmission filter, a reception filter, an amplifier, a mixer, an oscillator, a digital-to-analog convertor (DAC), an analog-to-digital convertor (ADC), and the like. In FIG. 10, only one antenna is illustrated, but the terminal may have a plurality of antennas. The RF processor 10-10 may include a plurality of RF chains. The RF processor 10-10 may perform beamforming. For beamforming, the RF processor 10-10 may adjust a phase and a magnitude of each of signals transmitted or received via the plurality of antennas or antenna elements.

The baseband processor 10-20 performs conversion between a baseband signal and a bitstream according to a physical layer specification of a system. For example, during data transmission, the baseband processor 10-20 generates complex symbols by encoding and modulating a transmission bitstream. When data is received, the baseband processor 10-20 reconstructs a reception bitstream via demodulation and decoding of the baseband signal provided from the RF processor 10-10. For example, in a case of conforming to an orthogonal frequency division multiplexing (OFDM) scheme, during data transmission, the baseband processor 10-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion. Further, during data reception, the baseband processor 10-20 divides the baseband signal provided from the RF processor 10-10 in units of OFDM symbols, reconstructs the signals mapped to the sub-carriers via a fast Fourier transform (FFT) operation, and then reconstructs the reception bitstream via demodulation and decoding.

The baseband processor 10-20 and the RF processor 10-10 transmit and receive signals as described above. Accordingly, the baseband processor 10-20 and the RF processor 10-10 may be referred to as a transmitter, a receiver, a transceiver, or a communication unit. Moreover, at least one of the baseband processor 10-20 and the RF processor 10-10 may include a plurality of communication modules to support a plurality of different radio access technologies. At least one of the baseband processor 10-20 and the RF processor 10-10 may include different communication modules to process signals in different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.5 Ghz and 5 Ghz) band and a millimeter wave (e.g., 60 GHz) band.

The memory 10-30 stores data, such as a default program, an application program, and configuration information, for operation of the terminal. Particularly, the memory 10-30 may store information related to a wireless LAN node performing wireless communication using a wireless LAN access technology. The memory 10-30 provides stored data in response to a request of the controller 10-40.

The controller 10-40 controls overall operations of the terminal. For example, the controller 10-40 transmits or receives a signal via the baseband processor 10-20 and the RF processor 10-10. The controller 10-40 records and reads data in the memory 10-30. To this end, the controller 10-40 may include at least one processor. For example, the controller 10-40 may include a communication processor (CP) configured to perform control for communication and an application processor (AP) configured to control an upper layer, such as an application program. According to an embodiment, the controller 10-40 includes a multi-connection processor 10-42 configured to perform processing for operation in a multi-connection mode. For example, the controller 10-40 may control the terminal to perform the procedure shown in the operation of the terminal illustrated in the embodiments of the disclosure.

The controller 10-40 according to an embodiment controls how to operate when an UL LBT problem is detected during DAPS HO by the aforementioned method.

Figure 11:
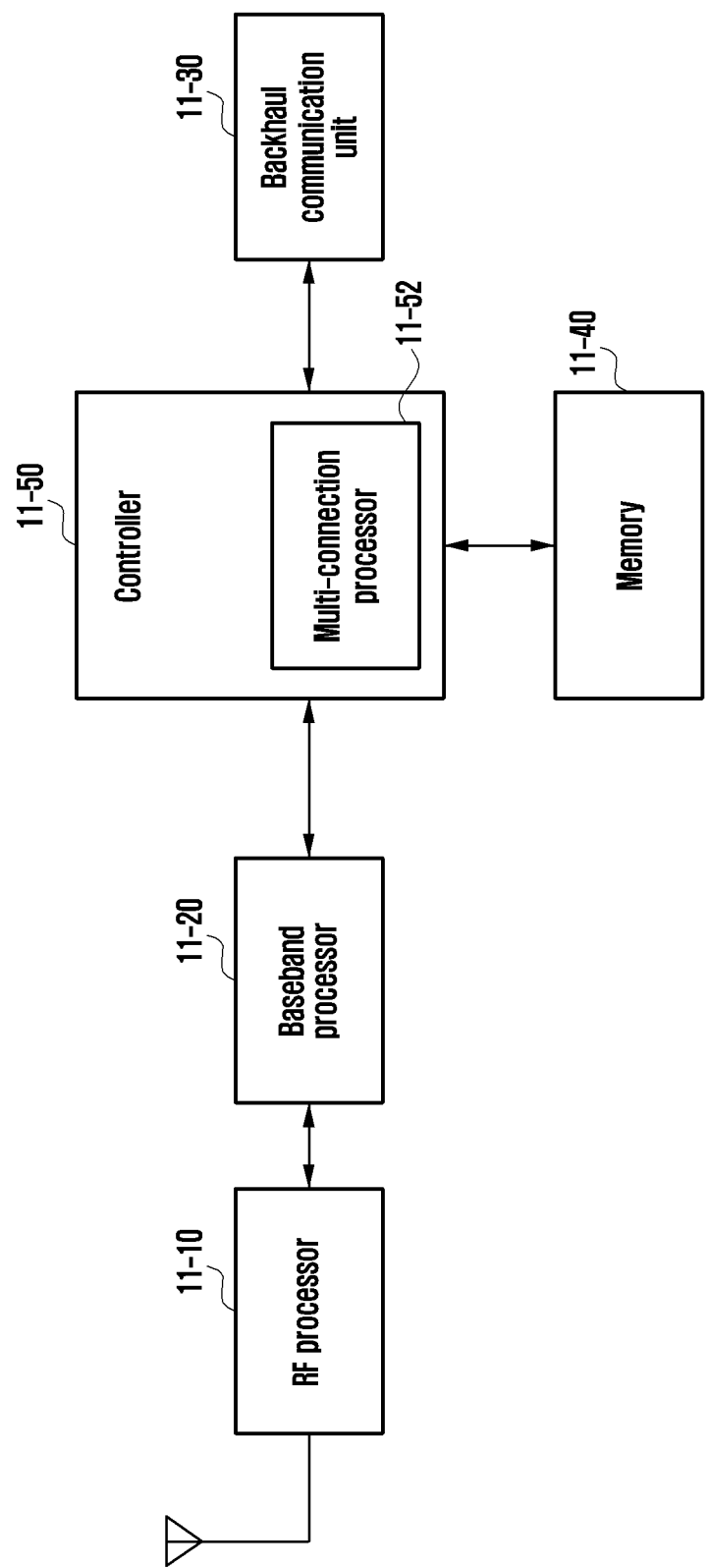
FIG. 11 illustrates a block diagram of a base station in a wireless communication system according to an embodiment of the disclosure.

FIG. 11 illustrates a block diagram of a base station in the wireless communication system according to an embodiment of the disclosure.

Referring to FIG. 11, the base station includes an RF processor 11-10, a baseband processor 11-20, a backhaul communication unit 11-30, a memory 11-40, and a controller 11-50.

The RF processor 11-10 performs a function for transmitting or receiving a signal via a radio channel, such as band conversion and amplification of the signal. That is, the RF processor 11-10 up-converts a baseband signal provided from the baseband processor 11-20 into an RF band signal, transmits the converted RF band signal via the antenna, and then down-converts the RF band signal received via the antenna into a baseband signal. For example, the RF processor 11-10 may include a transmission filter, a reception filter, an amplifier, a mixer, an oscillator, a DAC, an ADC, and the like. In FIG. 11, only one antenna is illustrated, but a first access node may include a plurality of antennas. The RF processor 11-10 may include a plurality of RF chains. The RF processor 11-10 may perform beamforming. For beamforming, the RF processor 11-10 may adjust a phase and a magnitude of each of signals transmitted or received via the plurality of antennas or antenna elements. The RF processor may perform downlink MIMO by transmitting one or more layers.

The baseband processor 11-20 performs a function of conversion between a baseband signal and a bitstream according to a physical layer specification of a first radio access technology. For example, during data transmission, the baseband processor 11-20 generates complex symbols by encoding and modulating a transmission bitstream. When data is received, the baseband processor 11-20 reconstructs a reception bitstream via demodulation and decoding of the baseband signal provided from the RF processor 11-10. For example, in a case of conforming to an OFDM scheme, during data transmission, the baseband processor 11-20 generates complex symbols by encoding and modulating a transmission bitstream, maps the complex symbols to sub-carriers, and then configures OFDM symbols by performing IFFT operation and CP insertion. Further, during data reception, the baseband processor 11-20 divides the baseband signal provided from the RF processor 11-10 in units of OFDM symbols, reconstructs the signals mapped to the sub-carriers via an FFT operation, and then reconstructs the reception bitstream via demodulation and decoding. The baseband processor 11-20 and the RF processor 11-10 transmit and receive signals as described above. Accordingly, the baseband processor 11-20 and the RF processor 11-10 may be referred to as a transmitter, a receiver, a transceiver, a communication unit, or a wireless communication unit.

The backhaul communication unit 11-30 provides an interface that performs communication with other nodes within a network. That is, the backhaul communication unit 11-30 converts, into a physical signal, a bitstream transmitted from the main base station to another node, such as an auxiliary base station and a core network, and converts a physical signal received from the other node into a bitstream.

The memory 11-40 stores data, such as a default program for operation of the main base station, an application program, and configuration information. Particularly, the memory 11-40 may store information on a bearer assigned to a connected terminal, a measurement result reported from the connected terminal, and the like. The memory 11-40 may store information serving as a criterion for determining whether to provide the terminal with multiple connections or to suspend the same. The memory 11-40 provides stored data in response to a request of the controller 11-50.

The controller 11-50 controls overall operations of the base station. For example, the controller 11-50 transmits or receives a signal via the baseband processor 11-20 and the RF processor 11-10 or via the backhaul communication unit 11-30. The controller 11-50 records and reads data in the memory 11-40. To this end, the controller 11-50 may include at least one processor. According to an embodiment, the controller 11-50 may include a multi-connection processor 11-52 configured to perform processing for operation in a multi-connection mode.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a source base station, a first message including first information used for detection of consistent uplink listen before talk (LBT) failures for the source base station;
   receiving, from the source base station, a second message for a handover to a target base station, the second message including second information for a reconfiguration with sync and third information configuring at least one dual active protocol stack (DAPS) bearer;
   detecting the consistent uplink LBT failures for the source base station based on the first information while performing a procedure associated with the handover; and
   based on the third information and the detection, suspending data communication of all data radio bearers (DRBs) associated with the source base station.

2. The method of claim 1, further comprising releasing a connection with the source base station.

3. The method of claim 1,
wherein at least one DRB from the all DRBs associated with the source base station is configured as the at least one DAPS bearer based on the third information,
wherein the second information for the reconfiguration with sync includes an identifier of the terminal to be used in the target base station and length information on a timer used for the handover, and
wherein the first message and the second message are received via a radio resource control (RRC) signaling.

4. The method of claim 3, wherein the second information for the reconfiguration with sync further includes configuration for contention free random access (CFRA) associated with the target base station.

5. The method of claim 3, wherein, in case that the timer is running, an identification of consistent uplink LBT failures for the target base station is skipped.

6. A method performed by a source base station in a communication system, the method comprising:
transmitting, to a terminal, a first message including first information used for detection of consistent uplink listen before talk (LBT) failures for the source base station; and
transmitting, to the terminal, a second message for a handover to a target base station, the second message including second information for a reconfiguration with sync and third information configuring at least one dual active protocol stack (DAPS) bearer,
wherein, the consistent uplink LBT failures for the source base station is detected based on the first information while a procedure associated with the handover is performed, in a response to the detection, data communication from the terminal of all data radio bearers (DRBs) associated with the source base station is suspended.

7. The method of claim 6, wherein a connection with the terminal is released.

8. The method of claim 6,
wherein at least one DRB from the all DRBs associated with the source base station is configured as the at least one DAPS bearer based on the third information,
wherein the second information for the reconfiguration with sync includes an identifier of the terminal to be used in the target base station and length information on a timer used for the handover, and
wherein the first message and the second message are transmitted via a radio resource control (RRC) signaling.

9. The method of claim 8, wherein the second information for the reconfiguration with sync further includes configuration for contention free random access (CFRA) associated with the target base station.

10. A terminal in a communication system, the terminal comprising:
a transceiver; and
a controller coupled with the transceiver and configured to:
receive, from a source base station, a first message including first information used for detection of consistent uplink listen before talk (LBT) failures for the source base station,
receive, from the source base station, a second message for a handover to a target base station, the second message including second information for a reconfiguration with sync and third information configuring at least one dual active protocol stack (DAPS) bearer,
detect the consistent uplink LBT failures for the source base station based on the first information while performing a procedure associated with the handover, and
based on the third information and the detection, suspend data communication of all data radio bearers (DRBs) associated with the source base station.

11. The terminal of claim 10, wherein the controller is further configured to release a connection with the source base station.

12. The terminal of claim 10,
wherein at least one DRB from the all DRBs associated with the source base station is configured as the at least one DAPS bearer based on the third information,
wherein the second information for the reconfiguration with sync includes an identifier of the terminal to be used in the target base station and length information on a timer used for the handover, and
wherein the first message and the second message are received via a radio resource control (RRC) signaling.

13. The terminal of claim 12, wherein the second information for the reconfiguration with sync further includes configuration for contention free random access (CFRA) associated with the target base station.

14. The terminal of claim 12, wherein, in case that the timer is running, an identification of consistent uplink LBT failures for the target base station is skipped.

15. A source base station in a communication system, the source base station comprising:
a transceiver; and
a controller coupled with the transceiver and configured to:
transmit, to a terminal, a first message including first information used for detection of consistent uplink listen before talk (LBT) failures for the source base station, and
transmit, to the terminal, a second message for a handover to a target base station, the second message including second information for a reconfiguration with sync and third information configuring at least one dual active protocol stack (DAPS) bearer,
wherein, the consistent uplink LBT failures for the source base station is detected based on the first information while a procedure associated with the handover is performed, in a response to the detection, data communication from the terminal of all data radio bearers (DRBs) associated with the source base station is suspended.

16. The source base station of claim 15, wherein a connection with the terminal is released.

17. The source base station of claim 15,
wherein at least one DRB from the all DRBs associated with the source base station is configured as the at least one DAPS bearer based on the third information,
wherein the second information for the reconfiguration with sync includes an identifier of the terminal to be used in the target base station and length information on a timer used for the handover, and
wherein the first message and the second message are transmitted via a radio resource control (RRC) signaling.

18. The source base station of claim 17, wherein the second information for the reconfiguration with sync further includes configuration for contention free random access (CFRA) associated with the target base station.

\* \* \* \* \*